(12) United States Patent
Enke et al.

(10) Patent No.: US 11,375,117 B2
(45) Date of Patent: *Jun. 28, 2022

(54) MODULAR IMAGE CAPTURE SYSTEMS

(71) Applicant: GoPro, Inc., San Mateo, CA (US)

(72) Inventors: Joseph A. Enke, Campbell, CA (US); Sean Flanigan, San Mateo, CA (US); Pablo Lema, Burlingame, CA (US); Nicholas D. Woodman, Woodside, CA (US); Michael Paterson, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 654 days.

This patent is subject to a terminal disclaimer.

(21) Appl. No.: 15/934,204

(22) Filed: Mar. 23, 2018

(65) Prior Publication Data
US 2019/0215457 A1 Jul. 11, 2019

Related U.S. Application Data

(60) Provisional application No. 62/614,140, filed on Jan. 5, 2018.

(51) Int. Cl.
*H04N 5/232* (2006.01)
*H04N 5/225* (2006.01)
(Continued)

(52) U.S. Cl.
CPC ....... *H04N 5/23287* (2013.01); *B64C 39/024* (2013.01); *B64D 47/08* (2013.01);
(Continued)

(58) Field of Classification Search
CPC ............. H04N 5/23287; H04N 5/2252; H04N 5/2253; H04N 5/2257; H04N 5/23203;
(Continued)

(56) References Cited

U.S. PATENT DOCUMENTS 5,469,209 A 11/1995 Gunday
5,548,327 A 8/1996 Gunday
(Continued)

FOREIGN PATENT DOCUMENTS

CN 101370128 A 2/2009
CN 101872196 A 10/2010
(Continued)

OTHER PUBLICATIONS

DJI Inspire 1 User Manual, V2.2, 2017 (Year: 2017) (64 pages).
(Continued)

*Primary Examiner* — Joseph G Ustaris
*Assistant Examiner* — Matthew David Kim
(74) *Attorney, Agent, or Firm* — Young Basile Hanlon & MacFarlane, P.C.

(57) ABSTRACT

Systems and methods are disclosed for image capture. For example, systems may include an image capture module including an image sensor configured to capture images, a base that includes a processing apparatus and a connector, and an integrated mechanical stabilization system configured to control an orientation of the image sensor relative to the base, wherein the processing apparatus is configured to send commands to motor controllers of the mechanical stabilization system and includes an image signal processor that is configured to receive image data from the image sensor; and a handheld module configured to be removably attached to the image capture module by the connector, wherein the handheld module includes a display configured to display images received from the image sensor via conductors of the connector.

18 Claims, 23 Drawing Sheets

(51) Int. Cl.
| | |
|---|---|
| G03B 15/00 | (2021.01) |
| H04N 7/18 | (2006.01) |
| B64D 47/08 | (2006.01) |
| B64C 39/02 | (2006.01) |
| G05D 1/00 | (2006.01) |
| G05D 1/12 | (2006.01) |
| G08G 5/00 | (2006.01) |
| G06F 3/04883 | (2022.01) |

(52) U.S. Cl.
CPC ......... *G03B 15/006* (2013.01); *G05D 1/0016* (2013.01); *G05D 1/0038* (2013.01); *G05D 1/0094* (2013.01); *G05D 1/12* (2013.01); *G08G 5/0069* (2013.01); *H04N 5/2252* (2013.01); *H04N 5/2253* (2013.01); *H04N 5/2257* (2013.01); *H04N 5/2328* (2013.01); *H04N 5/23203* (2013.01); *H04N 5/23216* (2013.01); *H04N 7/18* (2013.01); *B64C 2201/127* (2013.01); *B64C 2201/141* (2013.01); *B64C 2201/146* (2013.01); *G06F 3/04883* (2013.01); *H04N 7/183* (2013.01); *H04N 7/185* (2013.01)

(58) Field of Classification Search
CPC .... H04N 5/23216; H04N 5/2328; H04N 7/18; B64C 39/024; B64D 47/08; G03B 15/006; G05D 1/0016; G05D 1/0038; G05D 1/0094; G05D 1/12; G08G 5/0069
USPC ......................................................... 348/117
See application file for complete search history.

(56) References Cited

U.S. PATENT DOCUMENTS

| | | | |
|---|---|---|---|
| 7,643,063 B2 | 1/2010 | Trescott | |
| 7,932,925 B2 | 4/2011 | Inbar | |
| 8,861,947 B2 | 10/2014 | Webb | |
| 8,908,090 B2 | 12/2014 | Webb | |
| 9,143,686 B2 | 9/2015 | Lee | |
| 9,144,714 B2 | 9/2015 | Hollinger | |
| 9,239,468 B2 | 1/2016 | Webb | |
| 9,277,130 B2 | 3/2016 | Wang | |
| 9,360,740 B2 | 6/2016 | Wagner | |
| 9,436,181 B2 | 9/2016 | Peeters | |
| 9,574,703 B2 | 2/2017 | Firchau | |
| 9,692,972 B2 | 6/2017 | Karpenko | |
| 9,777,887 B2 * | 10/2017 | Pan | F16M 11/12 |
| 9,859,938 B2 | 1/2018 | Piccioni | |
| 9,863,171 B1 | 1/2018 | Salter | |
| 9,874,308 B2 | 1/2018 | Saika | |
| 10,008,028 B2 | 6/2018 | Zuccarino | |
| 10,129,478 B2 | 11/2018 | Zhao | |
| 10,150,576 B2 | 12/2018 | Saika | |
| 10,274,127 B2 | 4/2019 | Wei | |
| 10,735,653 B1 | 8/2020 | Huang | |
| 10,827,123 B1 * | 11/2020 | Flanigan | H04N 5/2253 |
| 2001/0013890 A1 | 8/2001 | Narayanaswami | |
| 2005/0243173 A1 | 11/2005 | Levine | |
| 2009/0219402 A1 | 9/2009 | Schneider | |
| 2011/0221900 A1 | 9/2011 | Reich | |
| 2012/0180789 A1 | 7/2012 | Tobia | |
| 2012/0268614 A1 | 10/2012 | Webb | |
| 2013/0088610 A1 | 4/2013 | Lee | |
| 2013/0210563 A1 | 8/2013 | Hollinger | |
| 2014/0024999 A1 | 1/2014 | Levien | |
| 2014/0263823 A1 | 9/2014 | Wang | |
| 2014/0368911 A1 | 12/2014 | Becker | |
| 2015/0085149 A1 | 3/2015 | Tsubaki | |
| 2015/0094883 A1 | 4/2015 | Peeters | |
| 2015/0097950 A1 | 4/2015 | Wang | |
| 2015/0149000 A1 | 5/2015 | Rischmuller | |
| 2015/0304652 A1 | 10/2015 | Spas | |
| 2015/0350543 A1 | 12/2015 | Hollinger | |
| 2015/0381891 A1 | 12/2015 | Karpenko | |
| 2016/0033077 A1 | 2/2016 | Chen | |
| 2016/0201847 A1 | 7/2016 | Firchau | |
| 2016/0352992 A1 * | 12/2016 | Saika | F16M 11/121 |
| 2016/0360111 A1 | 12/2016 | Thivent | |
| 2017/0006340 A1 | 1/2017 | Enke | |
| 2017/0041652 A1 | 2/2017 | Ko | |
| 2017/0064176 A1 | 3/2017 | Kim | |
| 2017/0134631 A1 | 5/2017 | Zhao | |
| 2017/0143442 A1 | 5/2017 | Tesar | |
| 2017/0178392 A1 | 6/2017 | Zuccarino | |
| 2017/0222676 A1 | 8/2017 | Piccioni | |
| 2017/0227162 A1 | 8/2017 | Saika | |
| 2017/0358141 A1 | 12/2017 | Stafford | |
| 2018/0025498 A1 | 1/2018 | Omari | |
| 2018/0079529 A1 | 3/2018 | Saika | |
| 2018/0093638 A1 | 4/2018 | Piccioni | |
| 2018/0194488 A1 | 7/2018 | Zhao | |
| 2018/0255247 A1 | 9/2018 | Ristroph | |
| 2018/0321328 A1 | 11/2018 | Kushleyev | |
| 2018/0352144 A1 | 12/2018 | Miao | |
| 2019/0008256 A1 | 1/2019 | Basham | |

FOREIGN PATENT DOCUMENTS

| | | |
|---|---|---|
| CN | 102355574 A | 2/2012 |
| CN | 103064430 A | 4/2013 |
| EP | 3139239 A1 | 3/2017 |
| JP | 2002051118 A | 2/2002 |
| WO | 0235824 A1 | 5/2002 |
| WO | 2017035840 A1 | 3/2017 |
| WO | 2018027340 | 2/2018 |

OTHER PUBLICATIONS

Film Like a Pro: DJI Drone "ActiveTrack"—With Video Tutorials, DJI, Dec. 18, 2017, https://store.dji.com/guides/ film-like-a-pro-with-activetrack/ (Year: 2017) (12 pages).
Rick Miller et al.: "Gimbal system configurations and line-of-sight control techniques for small UAV applications", Proceedings of SPIE, vol. 8713, May 31, 2013 (May 31, 2013), p. 871308, XP044347865, US DOI: 10.1117/12.2015777, ISBN: 978-1-5106-1533-5.
International Search Report and Written Opinion for Application No. PCT/US 2019/012253, dated Mar. 25, 2019, 14 pages.
Yi Action Gimbal | Yi Technology retrieved on Feb. 21, 2018 from URL https://www.yitechnology.com/yi-action-gimbal (18 pages).
Osmo—Reimagine Movement—DJI retrieved on Feb. 21, 2018 from URL https://www.dji.com/osmo (11 pages).
Karma Grip Let's Get Started retrieved on Feb. 21, 2018 from URL https://gopro.com/content/dam/help/karma/karma-grip-quick-start-guides/Karma-Grip_QSG_HERO5_ENG_REVA.pdf (7 pages).
U.S. Appl. No. 15/892,077, filed Feb. 8, 2018 (54 pgs.).

* cited by examiner

MODULAR IMAGE CAPTURE SYSTEMS

CROSS REFERENCE TO RELATED APPLICATIONS

This application claims the benefit of U.S. Provisional Application No. 62/614,140, filed Jan. 5, 2018, the contents of which are incorporated by reference herein in their entirety.

TECHNICAL FIELD

This disclosure relates to modular image capture systems.

BACKGROUND

Image capture devices, such as cameras, may capture content as images or video. Drones have been used to carry cameras and to enable capture of images from the air. Drones with attached cameras are typically controlled by controllers via a wireless communications link. Mechanical stabilization systems (e.g., gimbals and motors) have been used with drone based cameras to reduce distortion or shakiness of captured images that can be caused by vibrations and other motions of a drone during capture.

SUMMARY

Disclosed herein are implementations of modular image capture systems.

In a first aspect, the subject matter described in this specification can be embodied in handheld modules that include a battery; an electro-mechanical interface that is configured to removably attach the handheld module to an image capture module, wherein, when attached to the image capture module, the handheld module forms a communication link to the image capture module via the electro-mechanical interface and supplies power from the battery to the image capture module via conductors of the electro-mechanical interface; and a display that is configured to present images captured by the image capture module and received from the image capture module via the communication link.

In a second aspect, the subject matter described in this specification can be embodied in systems that include an image capture module including an image sensor configured to capture images, a base that includes a processing apparatus and a connector, and an integrated mechanical stabilization system configured to control an orientation of the image sensor relative to the base, wherein the processing apparatus is configured to send commands to motor controllers of the mechanical stabilization system and includes an image signal processor that is configured to receive image data from the image sensor; an aerial vehicle configured to be removably attached to the image capture module by the connector and to fly while carrying the image capture module; and a handheld module configured to be removably attached to the image capture module by the connector, wherein the handheld module includes a display configured to display images received from the image sensor via conductors of the connector.

In a third aspect, the subject matter described in this specification can be embodied in image capture modules that include an image sensor configured to capture images; a mechanical stabilization system, including gimbals and motors, that is integrated with the image sensor in the image capture module and configured to control an orientation of the image sensor; and a base including a processing apparatus and a connector configured to interchangeably connect the mechanical stabilization system to an aerial vehicle and a handheld module, wherein the processing apparatus is configured to send commands to motor controllers of the mechanical stabilization system and includes an image signal processor that is configured to receive image data from the image sensor.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings.

DETAILED DESCRIPTION

Figure 1A:
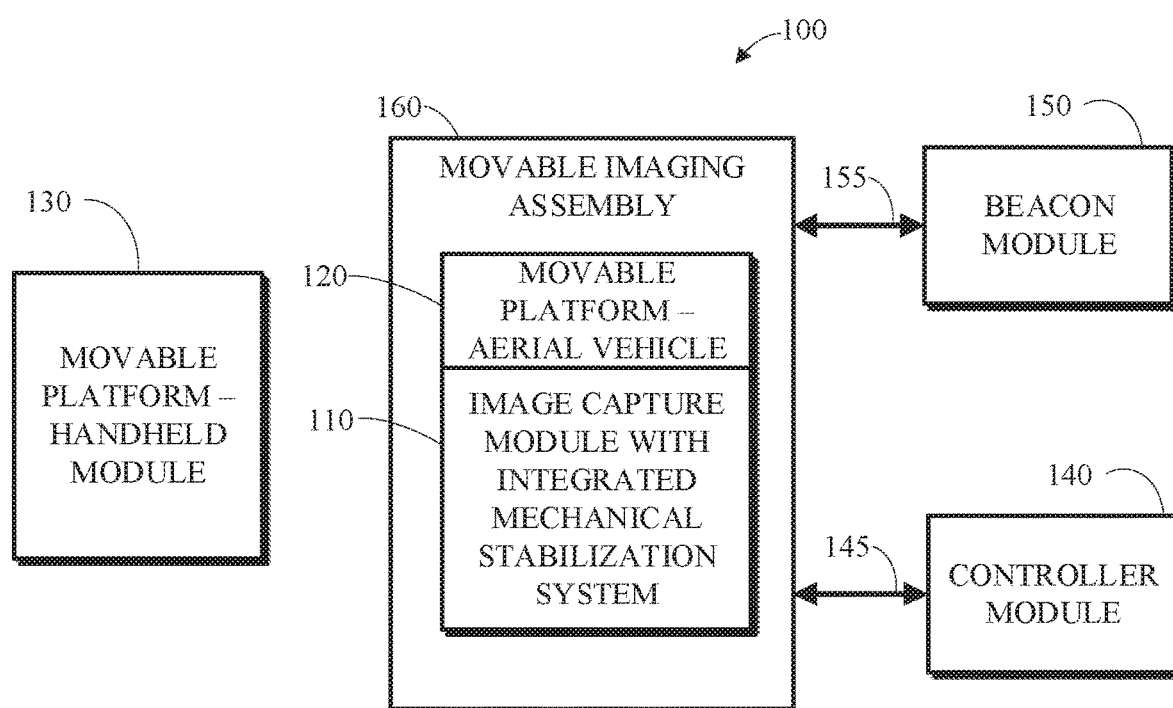
FIG. 1A is a block diagram of an example of a movable imaging system with modular components in a first usage scenario.

This document includes disclosure of modular image capture systems and techniques for image capture. An image capture module is described that includes an image sensor, a mechanical stabilization system (e.g., including gimbals and motors) that is integrated with the image sensor in the image capture module and configured to control an orientation of the image sensor, and a connector configured to interchangeably connect the mechanical stabilization system to an aerial vehicle and a handheld module. The image capture module can be easily connected to different movable platforms, including the aerial vehicle and the handheld module, to suit different circumstances and usage scenarios. By integrating the mechanical stabilization system in the image capture module, a more reliable and light weight attachment is provided between the mechanical stabilization system and the image sensor as compared to systems with a separable mechanical stabilization system.

The weight of the combination of the image capture module and the aerial vehicle is an important design consideration that effects performance in terms of maneuverability and power consumption, which directly effects usable battery time. The weight of the combination of the image capture module and the aerial vehicle can be further reduced by omitting a display and a battery from the image capture module (or including a considerably smaller battery) and instead incorporating a display and a battery in the handheld module, which can provide the power and control interface suited for handheld usage scenarios.

The proposed modular image capture systems and methods may offer advantages over conventional image capture systems. For example, the quality of captured images may be improved (e.g., by reducing blur and other motion artifacts and distortions) across a variety of usage scenarios by a mechanical stabilization system that is integrated into the image capture module that can be easily and interchangeably attached to a variety of movable platforms suited to those usage scenarios. For example, the weight of a movable imaging assembly including an aerial vehicle and the image capture module may be reduced, resulting in lower power consumption, longer battery usage times, greater maneuverability, and improved safety by reducing the risk of injuries or damage from collisions.

For example, an image capture module may include a base including a processing apparatus and a connector configured to interchangeably connect the mechanical stabilization system to an aerial vehicle and a handheld module. The processing apparatus may be configured to send commands to motor controllers of the mechanical stabilization system and includes an image signal processor that is configured to receive image data from the image sensor. In some implementations, the mechanical stabilization system includes an outer axis that is attached to the image sensor, a motion sensor, and a microphone; and the processing apparatus is configured to receive data from the motion sensor and data from the microphone via conductors routed through the mechanical stabilization system.

Implementations are described in detail with reference to the drawings, which are provided as examples to enable those skilled in the art to practice the technology. The figures and examples are not meant to limit the scope of the present disclosure to a single implementation or embodiment, and other implementations and embodiments are possible by way of interchange of, combination with, and/or removal of some or all of the described or illustrated elements. Wherever convenient, the same reference numbers will be used throughout the drawings to refer to same or like parts.

FIG. 1A is a block diagram of an example of a movable imaging system 100 with modular components in a first usage scenario. The movable imaging system 100 includes an image capture module 110 with an integrated mechanical stabilization system, an aerial vehicle 120, a handheld module 130, a controller module 140, and a beacon module 150. The image capture module 110 includes a connector that enables the aerial vehicle 120 and the handheld module 130 to be removably attached to the image capture module 110 as movable platforms for image capture in different usage scenarios. The connector may be mechanical and/or electrical. In this first usage scenario of FIG. 1A, the aerial vehicle 120 is attached to the image capture module 110 to form a movable imaging assembly 160 that may be used to capture images (e.g., still images or video) while the movable imaging assembly 160 moves in response to signals from the controller module 140 and/or the beacon module 150. In this first usage scenario of FIG. 1A, the handheld module 130 is disconnected from the image capture module 110.

The image capture module 110 includes an image sensor configured to capture images, a connector, and an integrated mechanical stabilization system configured to control an orientation of the image sensor relative to the connector. For example, the image capture module 110 may be the image capture module 200 of FIGS. 2A and 2B. For example, the image capture module 110 may be the image capture module 1200 of FIG. 12. The mechanical stabilization system is integrated in the sense that it is a part of the image capture module 110 that cannot be easily removed without the use of tools or damaging the image capture module 110. For example, the mechanical stabilization system may include gimbals (e.g., three gimbals) and motors that are configured to control an orientation of the image sensor relative to the connector. The mechanical stabilization system may enable capture of high quality images with low blur and/or reduced shaking or other motion between images in a sequence of images (e.g., frames of video). In some implementations, the mechanical stabilization system enables or improves subject tracking functions, in which a position and/or orientation of the image sensor is actively controlled to follow an object (e.g., a person) appearing a field of view of the image sensor. Having the mechanical stabilization system integrated avoids the use of a potentially unreliable connection between the mechanical stabilization system and the image sensor and can reduce the size and weight of the materials used to attached the mechanical stabilization system to the image sensor. Size and weight are generally important considerations in electronics, but they may be particularly significant in applications, like the first usage scenario of FIG. 1A, where the image capture module 110 including the image sensor and the mechanical stabilization system will be carried by the aerial vehicle 120. Reducing weight of the movable imaging assembly 160 may serve to decrease power consumption to increase battery time. Reducing weight of the movable imaging assembly 160 may also enable compliance with safety regulations applicable to the operation of the aerial vehicle 120 that limit weight of aerial vehicles.

The connector may be male or female. For example, the connector of the image capture module 110 may be keyed to a slot of the aerial vehicle 120 and keyed to a slot of the handheld module 130. The connector may be keyed by virtue of the shape of an outer surface of the connector, which is fitted to the corresponding shape of the slot in the aerial vehicle 120 and the corresponding shape in the slot of the handheld module 130. The keyed shape of the connector may include some asymmetry, which may facilitate easy connection of the aerial vehicle 120 and the handheld module 130 to the image capture module 110 by preventing a user from accidentally inserting the connector in an improper orientation. In some implementations, the connector includes one or more fastening mechanisms (e.g., latches) for securing a connection. The connector may include an electrical connector (e.g., a universal serial bus (USB) type C connector) nested inside of the keyed outer portion of the connector. The electrical connector may include multiple conductors that can be used to provide power from the aerial vehicle 120 to the image capture module 110 and transfer communication signals (e.g., USB 2.0, USB 3.0, I2C, SPI, and/or MIPI (Mobile Industry Processor Interface) signals) between the aerial vehicle 120 and the image capture module 110 when they are connected. For example, conductors of the connection may be used to transfer power, high-speed bulk data transfers, real-time embedded control signaling, and/or raw video signals at a capture frame rate. For example, the connector may include pairs of conductors respectively used to transfer power to the image capture module 110, bulk transfer data from the image capture module 110, transfer control signals to the image capture module 110, and transfer real-time video data from the image capture module 110. In some implementations, the connector lacks conductors for the transfer of data and/or power between the image capture module 110 and an attached movable platform (e.g., the aerial vehicle 120 in this first usage scenario). Power and/or data may be transferred wirelessly at short-range between the image capture module 110 and an attached movable platform. For example, the connector may include an interface for establishing a short-range, high-speed wireless link (e.g., employing technology promoted by Keyssa, Inc., which may be referred to as "Kiss Connectivity") for transferring data at suitable video capture data rates between the image capture module 110 and an attached movable platform. For example, the connector may include an interface (e.g., wireless charging interface or a near field communications interface) for inductively coupling power between the image capture module 110 and an attached movable platform. In some implementations, having a connector with fewer or no conductors may result in a more durable or reliable connector.

The image sensor of the image capture module 110 is configured to capture images (e.g., still images or frames of video). The image sensor may be configured to detect light of a certain spectrum (e.g., the visible spectrum or the infrared spectrum) and convey information constituting an image as electrical signals (e.g., analog or digital signals). For example, the image sensor may include charge-coupled devices (CCD) or active pixel sensors in complementary metal-oxide-semiconductor (CMOS). The image sensor may include an analog-to-digital converter and output digital image data. The image sensor may detect light incident through a lens (e.g., a rectilinear lens or a fisheye lens). In some implementations, the image capture module 110 includes multiple image sensors that have respective fields of view that overlap and images captured by these image sensors may be stitched together to generate composite images (e.g., panoramic images).

The movable imaging system 100 includes an aerial vehicle 120 (e.g., a drone) configured to be removably attached to the image capture module 110 by the connector and to fly while carrying the image capture module 110. The aerial vehicle 120 may be removably attached in the sense that a user can quickly connect and disconnect the aerial vehicle 120 from the image capture module 110 without using a tool (e.g., by engaging or disengaging one or more latches, rotary-type mechanisms, or click-type mechanisms using fingers). The aerial vehicle 120 may include a slot that fitted to the connector of the image capture module 110, in which the connector may be inserted. For example, the aerial vehicle 120 may include an electrical connector (e.g., a USB type C connector) nested in the slot that includes multiple conductors configured to transfer images and other data and control signals between the aerial vehicle 120 and the image capture module 110 when they are connected to form the movable imaging assembly 160. The nested electrical connector may further secure or guide the image capture module 110 into within the slot of the aerial vehicle 120. For example, the aerial vehicle 120 may be a quadcopter. In the first usage scenario of FIG. 1A, the aerial vehicle 120 is connected to the image capture module 110. For example, the aerial vehicle 120 may be the aerial vehicle 500 of FIG. 5. For example, the aerial vehicle 120 may be the aerial vehicle 1300 of FIG. 13.

The movable imaging system 100 includes a beacon module 150 configured to wirelessly transmit position data to the aerial vehicle 120 to enable the aerial vehicle 120 to follow the beacon module 150. The position data may be transmitted via a wireless link 155. For example, the beacon module 150 may include a global positioning system (GPS) receiver and the position data may include GPS coordinates of the beacon module 150. In some implementations, the beacon module 150 includes an inertial measurement unit (e.g., including accelerometers, gyroscopes, and/or magnetometers) and the position data includes changes in the position and/or orientation of the beacon module 150 that are sensed by the inertial measurement unit. For example, the wireless link 155 may utilize a wireless interface standard, such as WiFi, Bluetooth (BT), cellular data link, ZigBee, ANT+ link, or other wireless protocols. In some implementations, the aerial vehicle 120 is configured to follow a user based on position data from the beacon module 150 and based on computer vision tracking of the user in images from the image capture module. For example, quadratic estimation techniques (e.g., a Kalman filter) may be used to fuse position data from the beacon module 150 with computer vision features to estimate the position of a user holding or wearing the beacon module 150, and the position and/or orientation of the aerial vehicle 120 and the image sensor of the attached image capture module 110 may be controlled based on the estimate of the position of the user. For example, this control of the image sensor field of view may be actuated using the control surfaces (e.g., propellers) of the aerial vehicle 120 and/or the mechanical stabilization system (e.g., gimbals) of the image capture module 110. In some implementations, the beacon module 150 includes a user interface (e.g., including buttons and a display) that allows a user holding the beacon module 150 to issue commands to the movable imaging assembly 160 via the wireless link 155. For example, a user may issue commands to cause the movable imaging assembly 160 to follow the user, to pause following the user and hover in place, or to take-off or land. For example, the beacon module 150 may be the beacon module 650 of FIG. 6B. For example, the beacon module 150 may be the beacon module 1600 of FIG. 16.

The movable imaging system 100 includes a controller module 140 configured to wirelessly communicate with the aerial vehicle 120 to control motion of the aerial vehicle 120 and capture of images using the image sensor while the image capture module 110 is attached to the aerial vehicle 120. The controller module 140 includes a user interface (e.g., joysticks, buttons, and/or a touch-screen display) that allows a user to enter commands to control motion of the movable imaging assembly 160 and the capture of images. Information (e.g., control signals and/or image data) may be transferred between the movable imaging assembly 160 and the controller module via the wireless link 145. For example, the wireless link 145 may utilize a wireless interface standard, such as WiFi, Bluetooth (BT), cellular data link, ZigBee, ANT+ link, or other wireless protocols. For example, images (e.g., still images or video at full resolution or at reduced resolution) captured by the movable imaging assembly 160 may be received by the controller module 140 and displayed on a touch-screen display to the user. In some implementations, the aerial vehicle 120 is configured to communicate wirelessly with both the beacon module 150 and the controller module 140. Communicating with both the beacon module 150 and the controller module 140 may allow a first user to actively monitor and/or control image capture of the images by the movable imaging assembly 160 from the controller module 140 while the movable imaging assembly 160 follows a second user or other object that is bearing the beacon module 150 passively while moving. This may enhance hands-free following of a subject and enable following objects (e.g., a dog or a car) that are unable to issue commands to the movable imaging assembly 160 or make the experience of being followed more natural and less mentally taxing for the second user, so the second user can focus their attention on other activities (e.g., running, celebrating, soccer, skateboarding, motocross, surfing, snowboarding). The first user can focus on optimizing other aspects of image capture (e.g., choosing perspective on the subject, zooming, or timing snaps of still images) while the autonomous functions of the aerial vehicle 120 handle the following and navigation tasks. For example, the controller module 140 may be the controller module 600 of FIG. 6A. For example, the controller module 140 may be the controller module 1500 of FIG. 15.

Figure 1B:
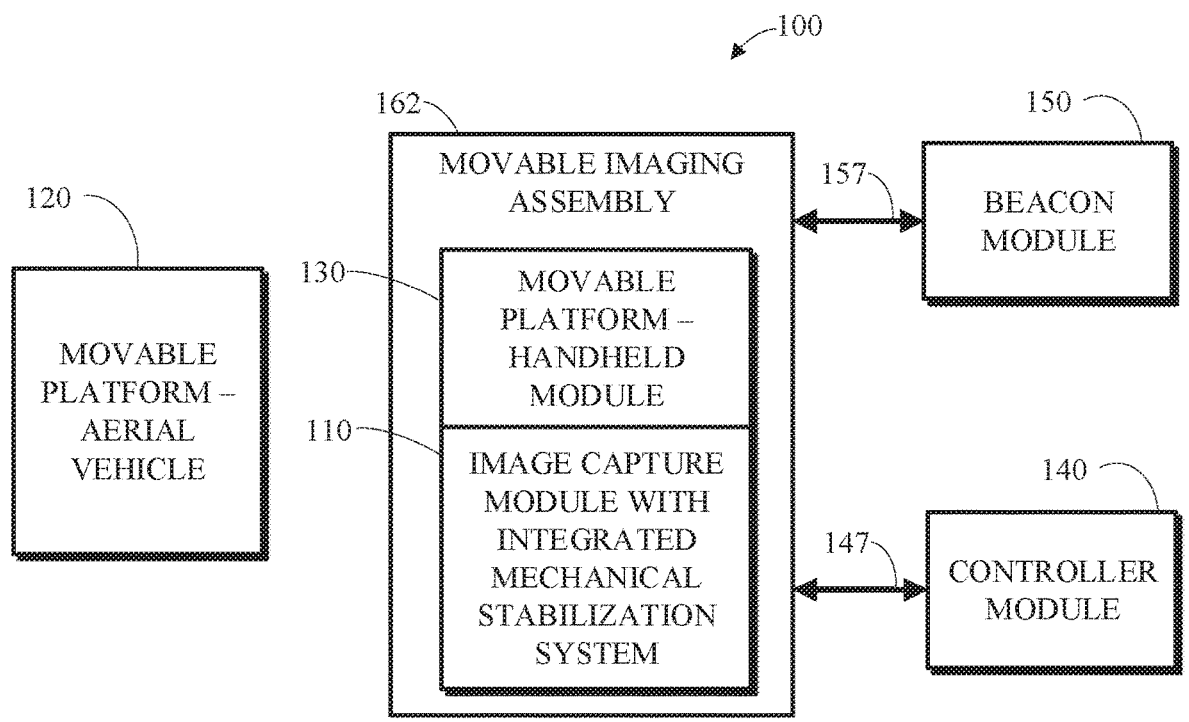
FIG. 1B is a block diagram of an example of a movable imaging system with modular components in a second usage scenario.

FIG. 1B is a block diagram of the movable imaging system 100 with modular components in a second usage scenario. In this second usage scenario of FIG. 1B, the handheld module 130 is attached to the image capture module 110 to form a movable imaging assembly 162 that may be used to capture images (e.g., still images or video) while the movable imaging assembly 162 moves in the hand of a user and/or in response to signals from the controller module 140 and/or the beacon module 150. In this second usage scenario of FIG. 1B, the aerial vehicle 120 is disconnected from the image capture module 110.

The movable imaging system 100 includes a handheld module 130 configured to be removably attached to the image capture module 110 by the connector. In some implementations, the handheld module 130 includes a battery and an integrated display configured to display images received from the image sensor (e.g., received via conductors of the connector or a short-range-high, high-speed wireless link). The handheld module 130 may be removably attached in the sense that a user can quickly connect and disconnect the handheld module 130 from the image capture module 110 without using a tool (e.g., by engaging or disengaging one or more latches, rotary-type mechanisms, or click-type mechanisms using fingers). In the second usage scenario of FIG. 1B, the handheld module 130 is connected to the image capture module 110. For example, the handheld module 130 may be the handheld module 300 of FIGS. 3A and 3B. For example, the handheld module 130 may be the handheld module 1100 of FIG. 11.

The handheld module 130 may include a slot that fitted to the connector of the image capture module 110, in which the connector may be inserted. For example, the handheld module 130 may include an electrical connector (e.g., a USB type C connector) nested in the slot that includes multiple conductors configured to transfer images and other data and control signals between the handheld module 130 and the image capture module 110 when they are connected to form the movable imaging assembly 162. The nested electrical connector may further secure or guide the image capture module 110 into within the slot of the handheld module 130. The slot of the handheld module 130 may include one or more fastening mechanisms configured to secure the attachment of the handheld module 130 to the connector during the second usage scenario of FIG. 1B. In some implementations, the handheld module 130 includes a first fastening mechanism and a second fastening mechanism (e.g., latches, clasps, or rotating mechanisms) configured to secure the connector when the image capture module is attached to the handheld module. The fastening mechanisms may be positioned such that either of the first fastening mechanism and second fastening mechanism is sufficient to secure the connector. In some implementations, a gimbal (e.g., a roll gimbal) of the mechanical stabilization system is substantially flush with a surface of the handheld module 130 when the image capture module is attached to the handheld module 130.

In the second usage scenario of FIG. 1B, for example, the movable imaging assembly 162 may be carried in a hand of a user who is able to point the image sensor at subjects for image capture and control image capture through a user interface (e.g., buttons and/or a touchscreen) of the handheld module 130. The user may view or preview captured images on a display of the handheld module 130. The battery of the handheld module 130 may provide power to the image capture module 110 during the second usage scenario.

In the second usage scenario of FIG. 1B, for example, the movable imaging assembly 162 may be mounted on a person or an object using a fastening article (e.g., a strap or helmet mount). For example, a skier may wear a strap or vest with a portion configured to hold the movable imaging assembly 162 in place on a portion of the skier's body (e.g., on the arm or chest) to capture images from their perspective as they move with their hands free down a slope. For example, the movable imaging assembly 162 may be positioned or mounted in a fixed location (e.g., on a tree branch or resting on the surface of a table). The movable imaging assembly 162 may be controlled by the controller module 140 and/or the beacon module 150 while mounted to adjust an orientation of the image sensor using the mechanical stabilization system (e.g., three gimbals and motors) and control other image capture features (e.g., snap a still image or adjust exposure time). Information (e.g., control signals and/or image data) may be transferred between the movable imaging assembly 162 and the controller module via the wireless link 147. For example, the wireless link 147 may utilize a wireless interface standard, such as WiFi, Bluetooth (BT), cellular data link, ZigBee, ANT+ link, or other wireless protocols. For example, images (e.g., still images or video at full resolution or at reduced resolution) captured by the movable imaging assembly 162 may be received by the controller module 140 and displayed on a touch-screen display to the user. The movable imaging assembly 162 may wirelessly receive position data from the beacon module 150 to enable the image sensor to follow the beacon module 150 by adjusting the orientation of the image sensor using the mechanical stabilization system. The position data may be received via a wireless link 157. For example, the wireless link 155 may utilize a wireless interface standard, such as WiFi, Bluetooth (BT), cellular data link, ZigBee, ANT+ link, or other wireless protocols. In some implementations, the movable imaging assembly 162 is configured to communicate wirelessly with both the beacon module 150 and the controller module 140 to enable following of a subject with the beacon module 150 with some supervision from a user of the controller module 140.

Although not explicitly shown in FIGS. 1A and 1B, the movable imaging system 100 may include additional components to facilitate image capture under diverse and potentially motion intensive circumstances. For example, the movable imaging system 100 may include a detachable flight battery for powering the aerial vehicle 120 and an AC charger for quickly charging the flight battery between flights in the first usage scenario. In some implementations, multiple detachable flight batteries are included in the movable imaging system 100 to continue use while a detachable flight battery is charging. For example, the movable imaging system 100 may include an AC charger for quickly charging the handheld module 130. For example, the movable imaging system 100 may include a mounting device (e.g., a strap, helmet mount, or mini tripod or wide base) for the handheld module 130. For example, the movable imaging system 100 may include one or more carrying cases for components of the movable imaging system 100. For example, the movable imaging system 100 may include cables (e.g., USB type C cable and HDMI cable) that can be used to connect a personal computing device (e.g., a smartphone, a tablet, or a laptop) to the image capture module 110, the aerial vehicle 120, and/or the handheld module 130 to perform bulk transfers of data (e.g., image data) and/or update software running on a processing apparatus of these components of the movable imaging system 100. An application may be installed on one or more external computing devices (e.g., a smartphone, a tablet, or a laptop) to facilitate pulling and sharing captured video content from the image capture module 110 and facilitating software upgrades to the image capture module 110, the aerial vehicle 120, the handheld module 130, and/or the controller module 140. The one or more external computing devices may communicate with the image capture module 110 via a wireless communications link or a wired communications link (e.g., a HDMI link). The application running on the external computing device may be configured to perform a variety of operations related to camera configuration, control of video acquisition, and/or display of video captured by the image capture module 110. An application (e.g., GoPro App) may enable a user to create short video clips and share video clips to a cloud service (e.g., cloud services commercially available from Instagram, Facebook, YouTube, or Dropbox); perform remote control of functions of the image capture module 110; live preview video being captured for shot framing; mark key moments while recording (e.g., HiLight Tag, View HiLight Tags in GoPro Camera Roll) for location and/or playback of video highlights; wirelessly control camera software; and/or perform other functions.

There may be multiple microphones positioned on the modular components of the movable imaging system 100. For example, an image capture module 110 may include two microphones positioned to facilitate the capture of stereo sound. For example, a single microphone may be included in the handheld module 130 (e.g., positioned on or near a side of the handheld module 130 that includes a display (e.g., the display 310). The microphone of the handheld module 130 may be used enable the suppression of wind noise. Having microphones on the image capture module 110 and the handheld module 130 may provide for diverse, well-spaced microphone locations on the movable imaging assembly 162, which may enable or improve noise suppression functions. A microphone located on the side of the handheld module 130 with the display may facilitate recording video with sound in a selfie use case for the movable imaging assembly 162. Having a single microphone in the handheld module may also reduce battery draining. In some implementations, multiple microphones are included on the handheld module 130 (e.g., to support the capture of stereo sound).

In some implementations, the movable imaging system 100 includes additional movable platforms that are configured to be removably attached to the image capture module 110 by the connector. For example, additional aerial vehicles with different size and range may be included. For example, an automated or autonomous land-based movable vehicle (e.g., a remote control car) may be included the movable imaging system 100 to support image capture in different circumstances, such as during a road race.

In some implementations, the movable imaging system 100 includes additional image capture modules with a connector like the connector of the image capture module 110 that is compatible to be removably attached to the aerial vehicle 120 and the handheld module 130. This may enable swapping out different versions of the image capture module 110 to tailor image capture capabilities to different usage scenarios. For example, some image capture modules may have only a single image sensor, while some image capture modules may have multiple image sensors and support panoramic image capture with stitching.

In some implementations, the handheld module 130 may be configured to control the movable imaging assembly 160 during the first usage scenario of FIG. 1A via wireless link. For example, the handheld module 130 may include hardware (e.g., a GPS receiver) and/or software to enable some or all of the functionality of the controller module 140 and/or the beacon module 150. For example, the handheld module 130 enable a user to issue a "follow-me" command to the movable imaging assembly 160 and transmit position data for the handheld module 130 to the movable imaging assembly 160 to cause the movable imaging assembly 160 to follow and capture images of a bearer of the handheld module. In some implementations (not shown), the controller module 140 and/or the beacon module 150 may be omitted from the movable imaging system 100.

In some implementations (not shown), a handheld module, with features similar to the handheld module 130, is integrated with an image capture module, with features similar to the image capture module 110, as a combined handheld image capture module. The combined handheld image capture module includes an image sensor, an integrated mechanical stabilization system configure to control an orientation of the image sensor, a display, a battery large enough to support operation similar to that described in the second usage scenario of FIG. 1B, and a connector configured to be removably attached to an aerial vehicle, which may be similar to the aerial vehicle 120, or another movable platform. For example, this aerial vehicle may include a hole or transparent panel in the bottom of the aerial vehicle through which the display and/or control interface of the combined handheld image capture module is visible and/or accessible while the combined handheld image capture module is attached to the aerial vehicle. For example, this accessible control interface may be used to control functions of the combined handheld image capture module and/or the aerial vehicle while they are attached. In some implementations, the display to the combined handheld image capture module may be powered down by default when the combined handheld image capture module is attached to the aerial vehicle or when in the air flying.

In some implementations (not shown), components and/or functionality of the controller module 140 and/or the beacon module 150 may be combined in a single device. The consolidation of these two devices may lessen the complexity, cost, and/or weight of the resulting movable imaging system with modular components.

In some implementations (not shown), a movable imaging system with modular components includes an image capture module without an integrated mechanical stabilization system that instead includes one or more modular mechanical stabilization systems (e.g., gimbals and motors) that are configured to be removably attached to the image capture module and multiple movable platforms. The one or more modular mechanical stabilization systems may be configured to control a relative orientation of an image sensor of the image capture module and a movable platform (e.g., an aerial vehicle or a handheld module) that is currently attached. For example, multiple modular mechanical stabilization systems may be included in this movable imaging system with different size, weight, and performance characteristics that are suited to different circumstances.

In some circumstances, it is desirable to track a target, which may include one or more subjects, with a movable imaging assembly (e.g., the movable imaging assembly 160 or the movable imaging assembly 162). Various forms of tracking may be utilized, including those discussed below and in U.S. Provisional Patent Application Ser. No. 62/364,960, filed Jul. 21, 2016, and herein incorporated by reference in its entirety. A tracking system may be utilized to implement the described forms of tracking. The tracking system may comprise a processor and algorithms that are used for tracking the target. A tracking system may be included entirely within the movable imaging assembly (e.g., the movable imaging assembly 160 or the movable imaging assembly 162) or entirely within the controller module 140 or an external computing device (e.g., a smartphone, a tablet, or a laptop) in communication with the movable imaging assembly, or portions of a tracking system may be located or duplicated within a movable imaging assembly and the controller module 140 or an external computing device. A voice recognition system may also be utilized to interact with the tracking system and issue commands (e.g., commands identifying or adjusting a target).

Figure 2A:
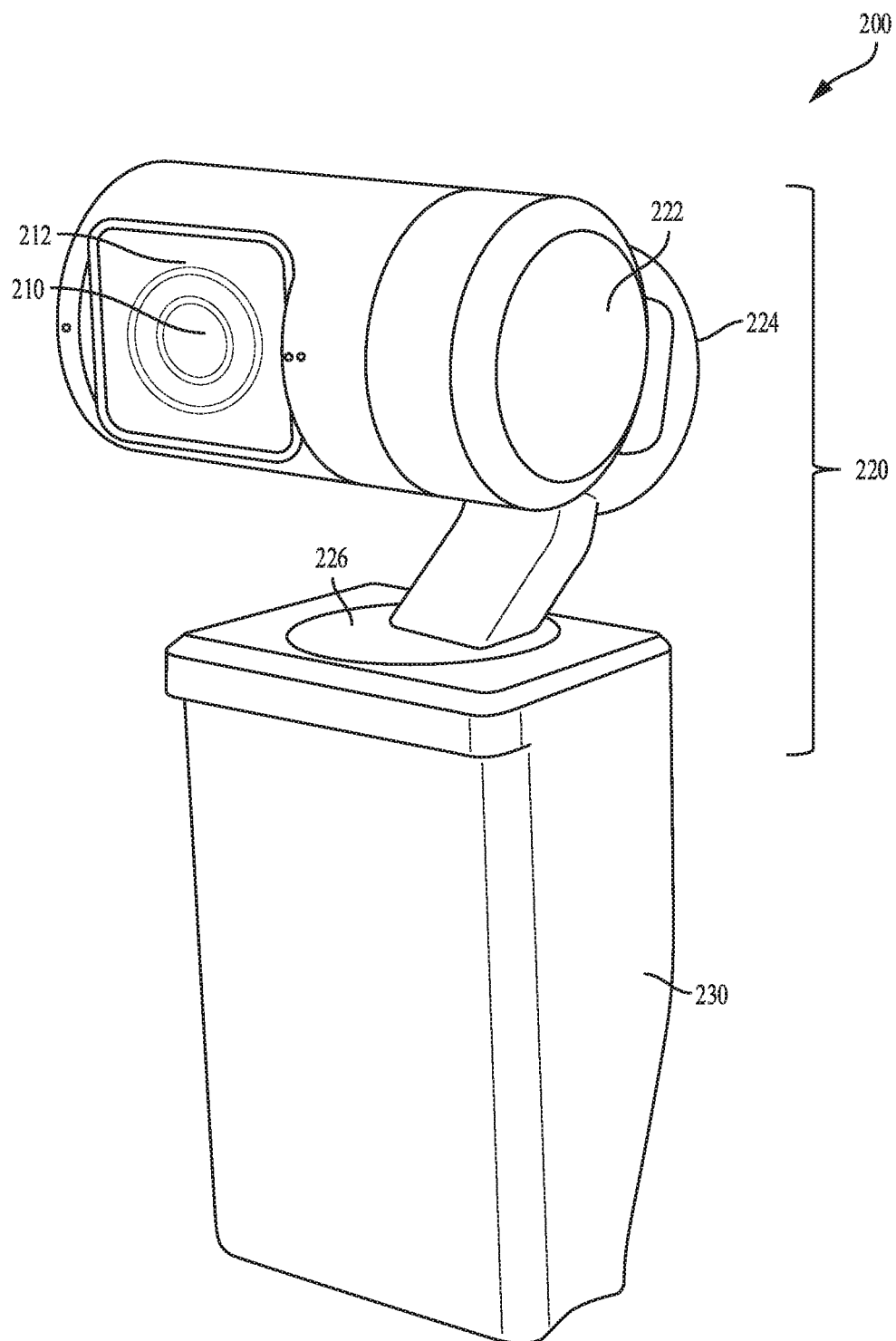
FIG. 2A is a pictorial illustration of an example of an image capture module from a first perspective.
Figure 2B:
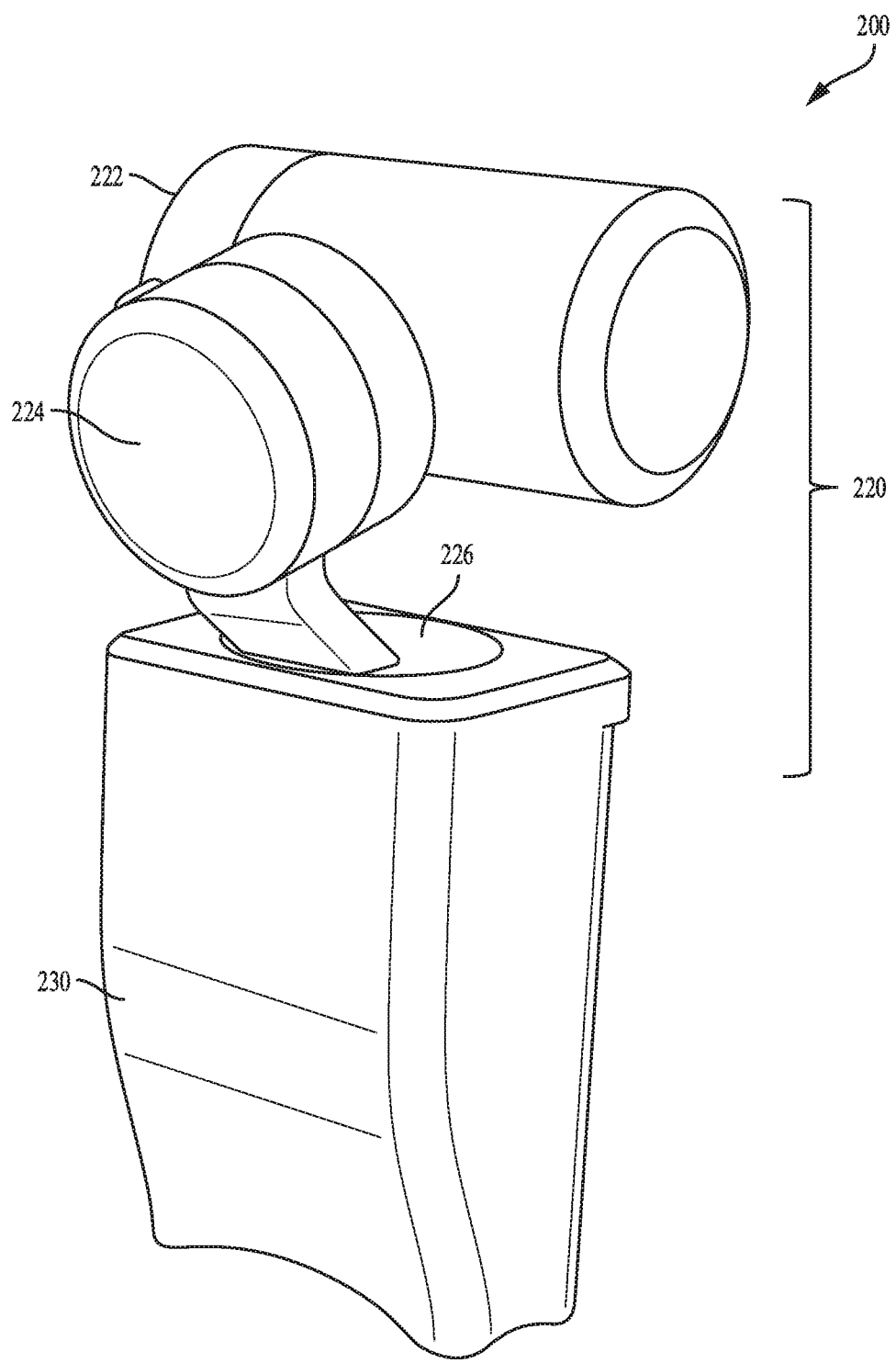
FIG. 2B is a pictorial illustration of an example of an image capture module from a second perspective.

FIGS. 2A and 2B are pictorial illustrations of an example of an image capture module 200 from two perspectives. The image capture module 200 includes an image sensor 210 configured to capture images; a mechanical stabilization system 220, including gimbals and motors (222, 224, and 226); and a connector 230 configured to interchangeably connect the mechanical stabilization system to an aerial vehicle (e.g., the aerial vehicle 120) and a handheld module (e.g., the handheld module 130).

The image capture module 200 includes an image sensor 210 configured to capture images (e.g., still images or frames of video). The image sensor 210 may be configured to detect light of a certain spectrum (e.g., the visible spectrum or the infrared spectrum) and convey information constituting an image as electrical signals (e.g., analog or digital signals). For example, the image sensor 210 may include charge-coupled devices (CCD) or active pixel sensors in complementary metal-oxide-semiconductor (CMOS). The image capture module 200 includes a lens 212 (e.g., a wide-angle rectilinear lens). The image sensor 210 detects light from the environment that is incident through the lens 212.

The image capture module 200 may also include a processing apparatus (e.g., including memory, an image signal processor, a hardware encoder, a microcontroller, and/or other processor) that is configured to track a user based on position data from a beacon module (e.g., the beacon module 150) and/or based on computer vision tracking of the user in images from the image sensor 210 in a first usage scenario, where the image capture module 200 is attached to an aerial vehicle (e.g., the aerial vehicle 500), and/or in a second usage scenario, where the image capture module 200 is attached to an handheld module (e.g., the handheld module 300). In some implementations, the processing apparatus may be configured to perform image processing operations (e.g., correction of dead pixels, band processing, decoupling of vertical blanking, spatial noise reduction, temporal noise reduction, automatic white balance, global tone mapping, local tone mapping, lens distortion correction, electronic rolling shutter correction, electronic image stabilization, output projection, and/or encoding) on images captured by the image sensor 210. In some implementations, some or all of the image processing operations are performed on the images captured by the image sensor by a processing apparatus that is located in whole or in part in another component of a larger movable imaging system 100. For example, the processing apparatus may be located inside the connector 230 below the gimbal 226 of the mechanical stabilization system 220.

The image capture module 200 includes a mechanical stabilization system 220, including gimbals and motors (222, 224, and 226) (e.g., corresponding to pitch, yaw, and roll respectively), that is integrated with the image sensor 210 in the image capture module 200 and configured to control an orientation of the image sensor 210. For example, the gimbals and motors (222, 224, and 226) may enable rotation of the image sensor with three degrees of freedom. In some implementations, the gimbals and motors (222, 224, and 226) respectively enable a wide range of rotation angles (e.g., up to 180 degrees, 270 degrees or 360 degrees). A gimbal 226 of the mechanical stabilization system 220 is substantially flush with a surface of the connector 230 causing the mechanical stabilization system 220 to have a low profile and protect the gimbal 226 from damage. In some implementations, the gimbal 226 is contained entirely within a body of the connector 230, at or below the grade of an outer surface of the connector 230. For example, the mechanical stabilization system 220 may be controlled with a controller (e.g., a proportional integral derivative controller) based on target orientations determined by a processing apparatus based on image data from the image sensor 210, motion sensor data from a motion sensor in the image capture module 200 or moving platform (e.g., the aerial vehicle 120 or the handheld module 130) to which the image capture module 200 module is attached, and/or position data for a tracking target from a beacon (e.g., the beacon module 150).

The mechanical stabilization system 220 may be configured to enable an electronically actuated transport mode. When many 3-axis gimbals are powered off they simply float around aimlessly and are cumbersome to put away or transport. In some implementations, the mechanical stabilization system 220 is configured to enable an electronically actuated transport mode in which: upon the occurrence of triggering event (e.g., a specialized user command or a command to power OFF the image capture module 200 or the mechanical stabilization system 220, each of the gimbals and motors (222, 224, and 226) are electronically controlled to assume a fold-flat position and maintain that position for a fixed time period (e.g., 10, 30, or 60 seconds), allowing the user to easily slip the image capture module 200 into a pocket, carrying case, backpack, or other container. After the time has expired, the mechanical stabilization system 220 will completely power OFF allowing the gimbal arms to move freely, once in the desired transport location. In some implementations, this electronically actuated transport mode can be accompanied by a physical lock which is either integrated into the gimbal itself, or via an external means such as a bracket or carrying case. For example, the electronically actuated transport mode may be implemented using electronic motor position sensors, mechanical fold-flat ability (range-of-motion), and firmware control (e.g., implemented in a processing apparatus of the image capture module 200).

The image capture module 200 includes a connector 230 configured to interchangeably connect the mechanical stabilization system 220 to an aerial vehicle (e.g., the aerial vehicle 120) in a first usage scenario and a handheld module in a second usage scenario (e.g., the handheld module 130). The connector may be keyed to a slot of the aerial vehicle and keyed to a slot of the handheld module. The connector 230 is keyed by virtue of the shape of an outer surface of the connector 230, which is fitted to the corresponding shape of the slot in the aerial vehicle (e.g., the aerial vehicle 500) and the corresponding shape in the slot of the handheld module (e.g., the handheld module 300). The keyed shape of the connector 230 includes some asymmetry (i.e., the rectangular cross-section of the connector 230 that narrows, sloping inward, about half way down the connector 230 on one side), which may facilitate easy connection of the aerial vehicle and the handheld module to the image capture module 200 by preventing a user from accidentally inserting the connector 230 in an improper orientation. For example, the connector 230 may include a first fastening mechanism and a second fastening mechanism configured to secure the connector 230 when the image capture module 200 is attached to the handheld module. The fastening mechanisms may be configured such that either of the first fastening mechanism and second fastening mechanism is sufficient to secure the connector 230. The connector 230 includes an electrical connector (e.g., a universal serial bus (USB) type C connector) nested inside of the keyed outer portion of the connector 230. The electrical connector may include multiple conductors that can be used to provide power from a movable platform (e.g., the aerial vehicle 500 or the handheld module 300) to the image capture module 200 and transfer communication signals (e.g., USB 2.0, USB 3.0, I2C, SPI, and/or MIPI signals) between the movable platform and the image capture module 200 when they are connected. In some implementations, the connector 230 includes pairs of conductors respectively used to transfer power to the image capture module 200, bulk transfer data from the image capture module 200, transfer control signals to the image capture module 200, and transfer real-time video data from the image capture module 200.

The connector may include an electrical connector (e.g., a universal serial bus (USB) type C connector) nested inside of the keyed outer portion of the connector. The electrical connector may include multiple conductors that can be used to provide power from the aerial vehicle 120 to the image capture module 110 and transfer communication signals (e.g., USB 2.0, USB 3.0, I2C, SPI, and/or MIPI (Mobile Industry Processor Interface) signals) between the aerial vehicle 120 and the image capture module 110 when they are connected. For example, conductors of the connection may be used to transfer power, high-speed bulk data transfers, real-time embedded control signaling, and/or raw video signals at a capture frame rate. For example, the connector may include pairs of conductors respectively used to transfer power to the image capture module 110, bulk transfer data from the image capture module 110, transfer control signals to the image capture module 110, and transfer real-time video data from the image capture module 110.

In the example of FIGS. 2A and 2B, the gimbal 226 of the mechanical stabilization system 220 is substantially flush with a surface of the connector 230. The gimbal 226 may be protected by a body of the connector 230 to protect the gimbal from damage and/or the ingress of dust. For example, gimbal 226 may be a roll gimbal and with a corresponding roll motor with a roll motor housing that is built into the housing of the connector 230 so that the roll motor housing sits below the grade of an outer surface of the connector 230 and is hidden and/or protected. This configuration may provide advantages over other mechanical stabilization systems with all of their gimbals exposed (e.g., three axis gimbals exposed, including a roll axis motor housing sitting on top of a main housing). For example, locating the gimbal 226 within the connector 230 and/or substantial flush with a surface of the connector 230 may reduce amount of exposed gimbal parts, reduce height of gimbal above a main housing, and/or simplify the overall design by reducing the number visible motor elements (e.g., from three gimbals two gimbals).

Figure 3A:
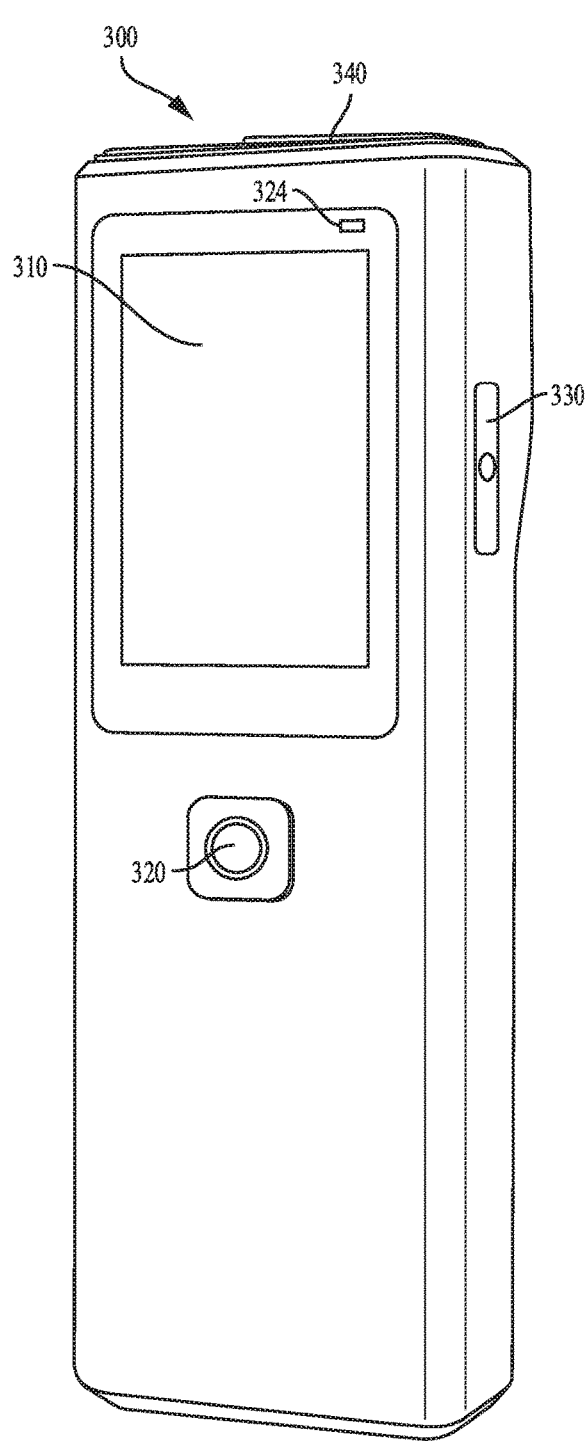
FIG. 3A is a pictorial illustration of an example of a handheld module from a first perspective.
Figure 3B:
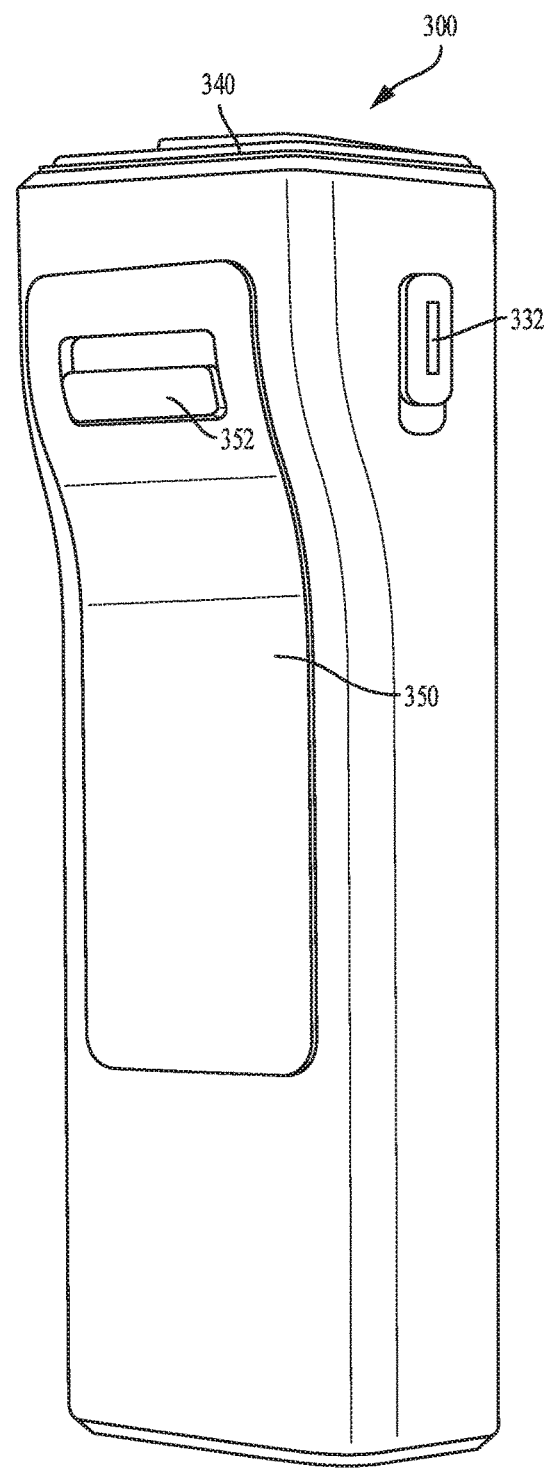
FIG. 3B is a pictorial illustration of an example of a handheld module from a second perspective.

FIGS. 3A and 3B are pictorial illustrations of an example of a handheld module 300 from two perspectives. The handheld module 300 includes a display 310, a record button 320, a status indicator light 324, a first fastening mechanism 330 and a second fastening mechanism 332, a slot 340 with a shape matched to the connector 230 of the image capture module 200, and a battery cover 350 with a battery release latch 352.

The handheld module 300 may be shaped such that it may be ergonomically held in a hand during use while operating a touch display and/or a button (e.g., the record button 320) of the handheld module 300. The outer material may be selected to have a rubbery grip texture.

The handheld module 300 includes a user interface that allows a user to control image capture with an attached image capture module (e.g., the image capture module 200). The user interface includes the display 310 for viewing captured images, the record button 320 for snapping still images or starting or stopping recording of video, and the status indicator light 324. The status indicator light 324 may include a multi-color LED device and may reflect the status of an electronic connection to an attached image capture module and/or a recording state. In some implementations, the display 310 is a touch-screen that enables the input of additional commands by a user. For example, a user may input commands to change a gimbal angle; enter "selfie-mode," or "HiLight Tag" by voice command and/or input received via the touch interface of the display 310 and/or a button of the handheld module 300. A "selfie-mode" function may rotate the gimbal 226 (e.g., rotate 180 degrees), such that an image sensor (e.g., the image sensor 210) faces the same direction as the display 310. A "HiLight Tag" function may enable a user to mark an image or frames of video as significant with metadata. For example, a "High-Light Tag" gesture may be defined for a touch screen interface of the display 310, which may enable a user to generate portions of a video data temporally and/or spatially by specifying an object or other portions of a frame as frames are displayed on the display 310.

The first fastening mechanism 330 and the second fastening mechanism 332 are configured to secure the connector 230 of the image capture module 200 when it is inserted in the slot 340 to attach the handheld module 300 to the image capture module 200. The first fastening mechanism 330 and the second fastening mechanism 332 include a button and a slider, respectively, that may be used to disengage the first fastening mechanism 330 and the second fastening mechanism 332 in order to disconnect from and attached image capture module (e.g., the image capture module 200). Other types of fastening mechanisms are also possible.

The battery cover 350 may be opened using the battery release latch 352 to access a battery of the handheld module 300 for replacement or recharging. For example, multiple batteries may be used and swapped into the handheld module 300 to enable continued use while one of the batteries is charged in an external charger.

Figure 4A:
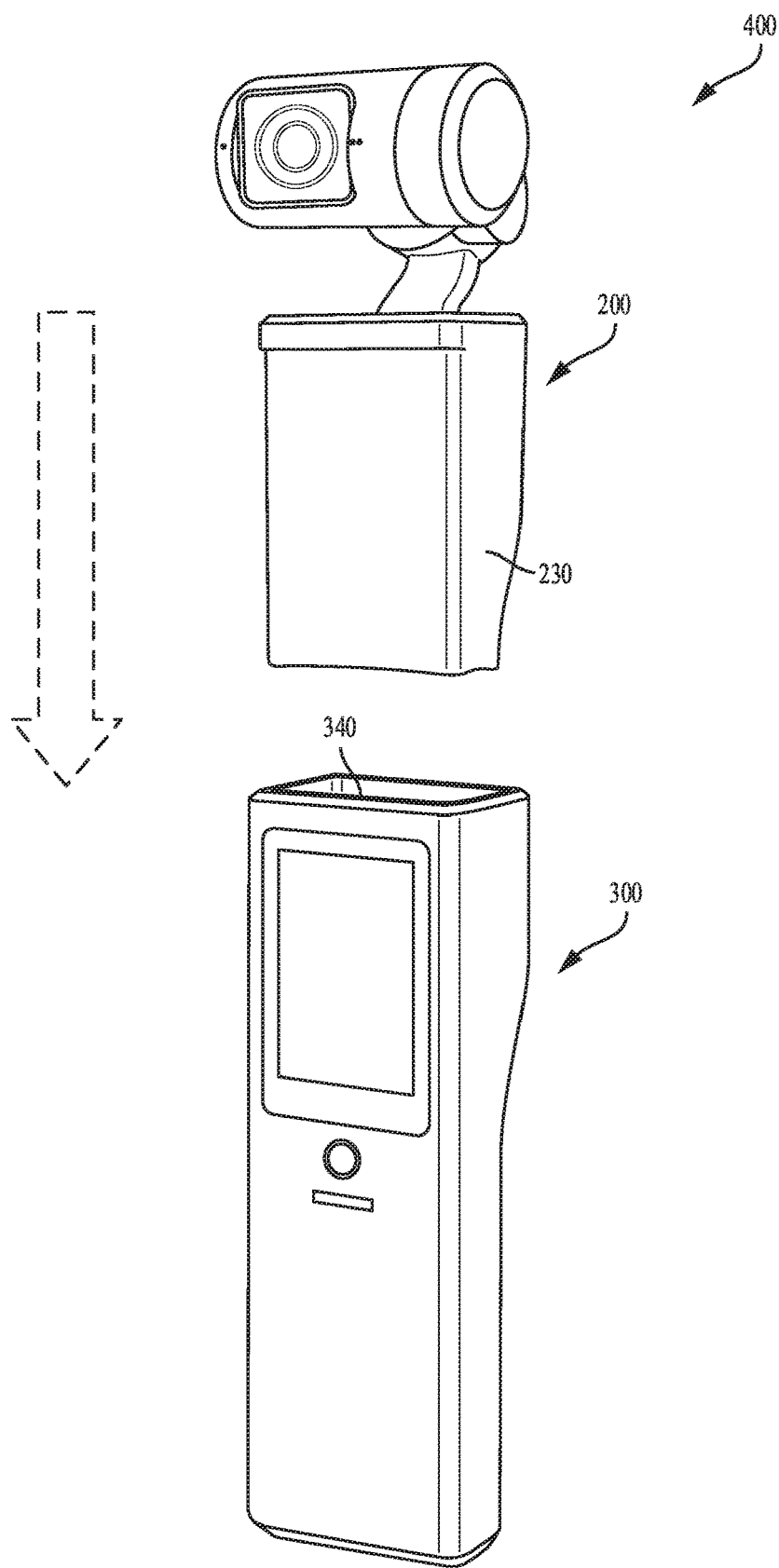
FIG. 4A is a pictorial illustration of an example of a handheld module oriented to be connected to an image capture module.

FIG. 4A is a pictorial illustration of an example of a handheld module 300 oriented to be connected to an image capture module 200 to form a movable imaging assembly 400. The connector 230 of the image capture module 200 is keyed to the slot 340 of the handheld module 300. From the illustrated orientation, the image capture module 200 may be moved down to slide the connector 230 into the slot 340 to attach the image capture module 200 to the handheld module 300 to form the movable imaging assembly 400. When the connector 230 is inserted into the slot 340, paired fastening mechanisms (e.g., latches) in the connector 230 and the slot 340 may engage to secure the newly formed connection. For example, spring loaded latches may engage to secure the connection of the movable imaging assembly 400. As part of the connection, mated electronic connectors (e.g., USB Type C connectors) nested in the connector 230 and the slot 340 may engage to form an electronic connection including multiple conductors, which may be used to supply power from the handheld module 300 to image capture module 200 and to transfer control signals and data (e.g., image data) between the attached modules of the movable imaging assembly 400.

When a user seeks to disconnect the handheld module 300 from the image capture module 200, they may release these fastening mechanisms. For example, latches may be manually released by a user using their fingers on buttons or release levers. In some implementations, two latches must be simultaneously released in order to disconnect the handheld module 300 from the image capture module 200, which may reduce the risk of accidental disconnection. For example, a cycle of connecting and disconnecting the handheld module 300 from the image capture module 200 may only take a few seconds for a user to complete.

Figure 4B:
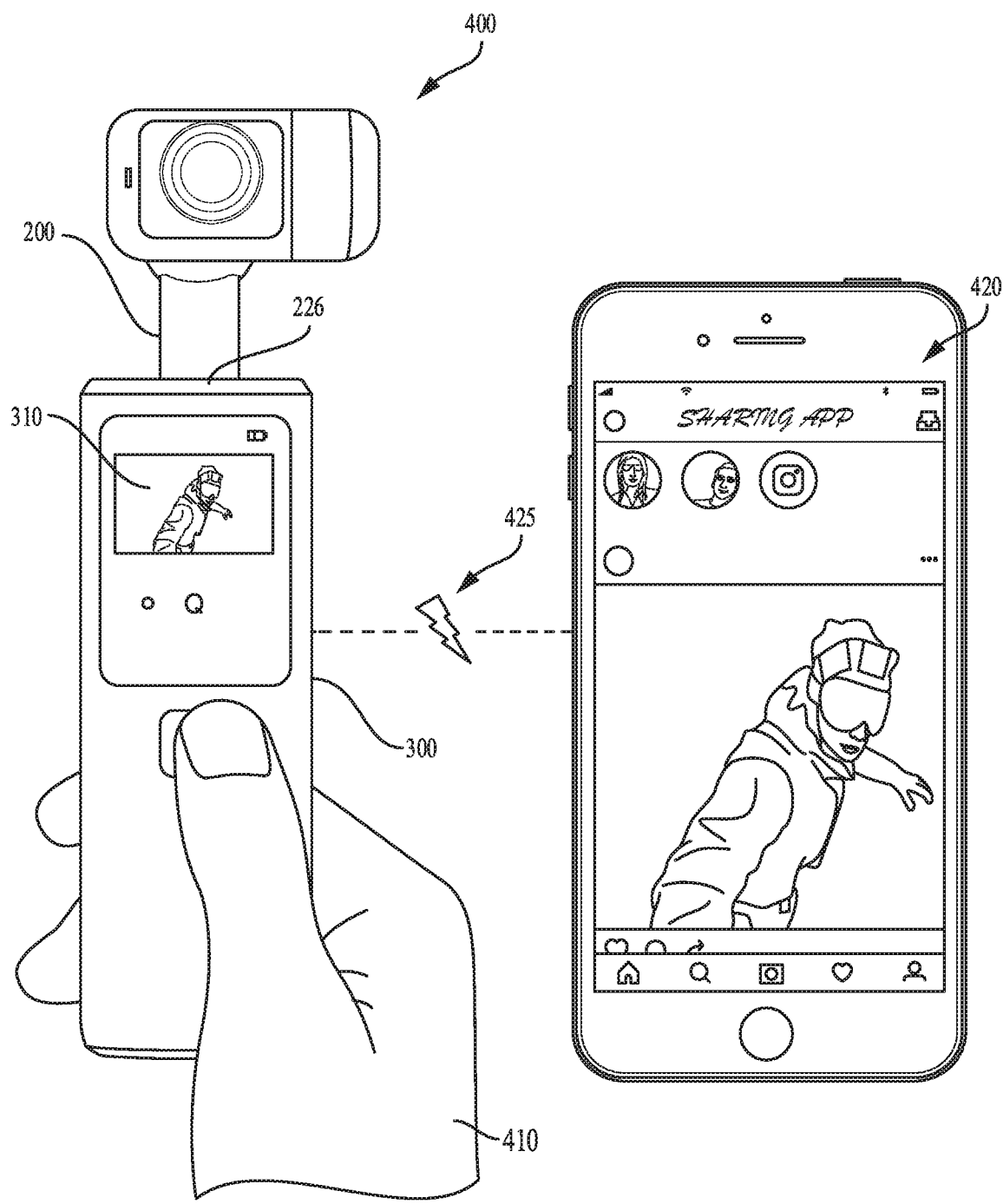
FIG. 4B is a pictorial illustration of an example of a movable imaging assembly in communication with a personal computing device.

FIG. 4B is a pictorial illustration of an example of a movable imaging assembly 400 in communication with a personal computing device 420. In the usage scenario of FIG. 4B, the movable imaging assembly 400 is held in a hand 410 of a user and is capturing images (e.g., still images or frames of video) of the user. The captured images are displayed on the display 310 of the handheld module 300. The captured images may be transferred to the personal computing device 420 (e.g., a smartphone) via a wireless link 425 (e.g., using a Bluetooth link or a WiFi link). The personal computing device 420 may then be used to display and/or share or otherwise transmit and distribute the captured images. The personal computing device 420 may also be configured with an application that may be used to remotely control image capture functions of the movable imaging assembly 400 and/or update software installed on a processing apparatus of the movable imaging assembly 400.

In this example, a gimbal 226 of the mechanical stabilization system is substantially flush with a surface (e.g., the top surface) of the handheld module 300 when the image capture module 200 is attached to the handheld module 300. This may result in the mechanical stabilization system and the image sensor having a low profile and protecting the gimbal 226 to reduce risk of damage to the gimbal 226. This configuration may provide advantages over other mechanical stabilization systems with all of their gimbals exposed (e.g., three axis gimbals exposed, including a roll axis motor housing sitting on top of a main housing). For example, locating the gimbal 226 within the handheld module 300 and/or substantial flush with a surface of the handheld module 300 when the image capture module 200 is attached to the handheld module 300 may reduce amount of exposed gimbal parts, reduce height of gimbal above a main housing, and/or simplify the overall design by reducing the number of visible motor elements (e.g., from three gimbals two gimbals).

Figure 5A:
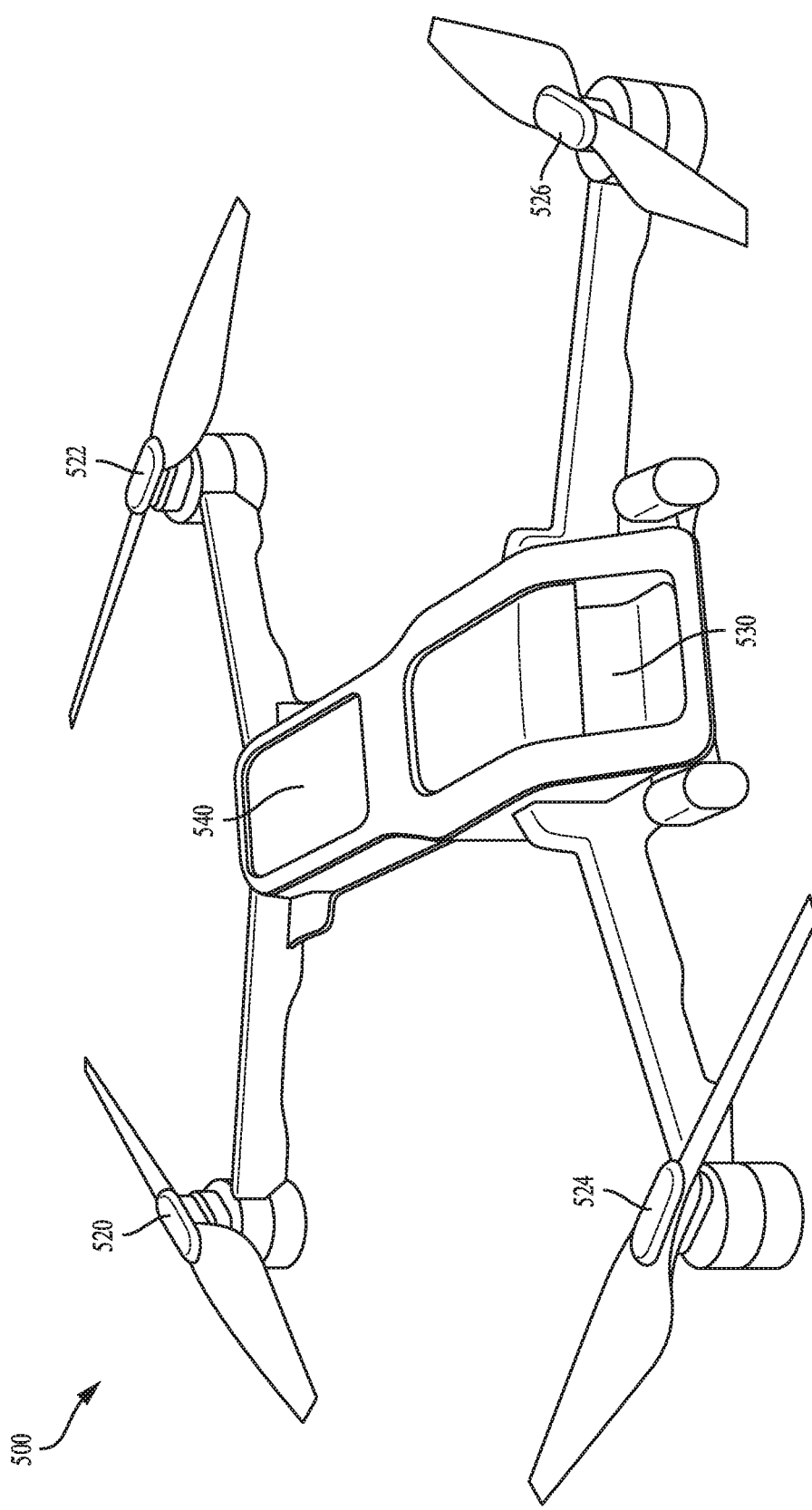
FIG. 5A is a pictorial illustration of an example of an aerial vehicle.

FIG. 5A is a pictorial illustration of an example of an aerial vehicle 500. In this example, the aerial vehicle 500 is quadcopter drone. The aerial vehicle 500 includes four propellers (520, 522, 524, and 526); a slot 530 that is shaped to match the connector 230 of the image capture module 200; and a detachable flight battery 540. The propellers (520, 522, 524, and 526) are control surfaces that may be controlled via respective motors to control the motion of the aerial vehicle 500. For example, the aerial vehicle 500 may include an electrical connector (e.g., a USB type C connector) nested in the slot 530 that includes multiple conductors configured to transfer images and other data and control signals between the aerial vehicle 500 and the image capture module 200 when they are attached by inserting the connector 230 in the slot 530. In some implementations, the detachable flight battery 540 may be charged quickly with a high speed AC charging station when the detachable flight battery 540 is removed from the aerial vehicle 500

Figure 5B:
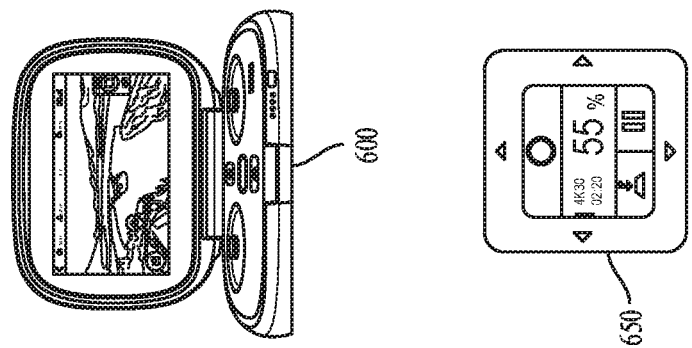
FIG. 5B is a pictorial illustration of an example of a movable imaging assembly in communication with a controller module and a beacon module.
Figure 5B:
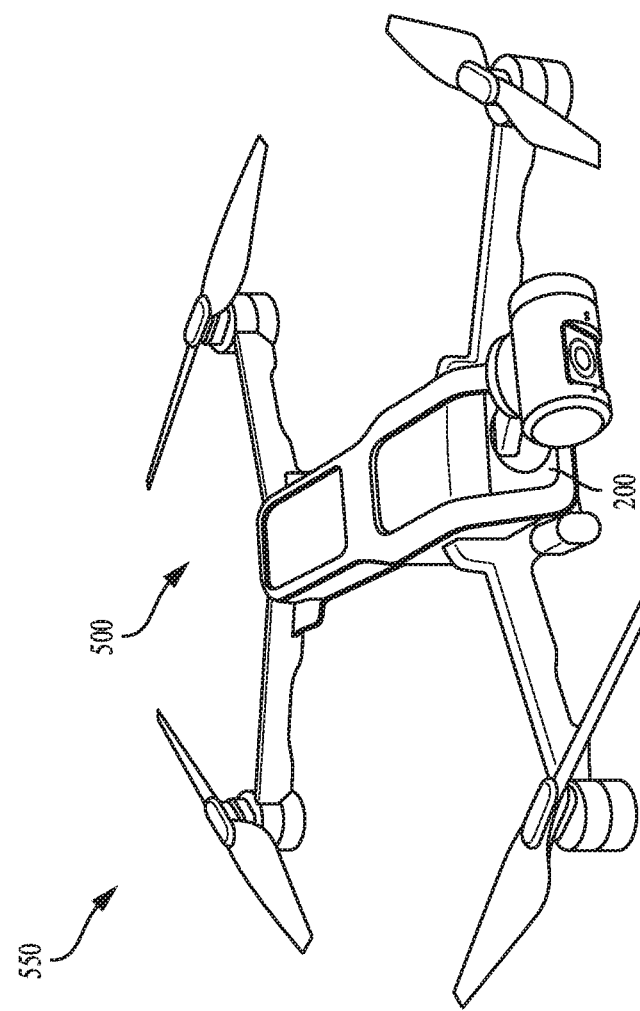

FIG. 5B is a pictorial illustration of an example of a movable imaging assembly 550 in communication with a controller module 600 and a beacon module 650. The movable imaging assembly 550 is formed when the image capture module 200 is attached to the aerial vehicle 500 by inserting the connector 230 into the slot 530. When the connector 230 is inserted into the slot 530, paired fastening mechanisms (e.g., latches) in the connector 230 and the slot 530 may engage to secure the newly formed connection. For example, spring loaded latches may engage to secure the connection of the movable imaging assembly 550. As part of the connection, mated electronic connectors (e.g., USB Type C connectors) nested in the connector 230 and the slot 530 may engage to form an electronic connection including multiple conductors, which may be used to supply power from the aerial vehicle 500 to the image capture module 200 and to transfer control signals and data (e.g., image data) between the attached modules of the movable imaging assembly 550.

When a user seeks to disconnect the aerial vehicle 500 from the image capture module 200, they may release these fastening mechanisms. For example, latches may be manually released by a user using their fingers on buttons or release levers. In some implementations, two latches must be simultaneously released in order to disconnect the aerial vehicle 500 from the image capture module 200, which may reduce the risk of accidental disconnection. For example, a cycle of connecting and disconnecting the aerial vehicle 500 from the image capture module 200 may only take a few seconds for a user to complete.

The movable imaging assembly 550 may be in communication via wireless links with the controller module 600 and the beacon module 650. In some implementations, the movable imaging assembly 550 is configured to communicate wirelessly with both the beacon module 650 and the controller module 600. Communicating with both the beacon module 650 and the controller module 600 may allow a first user to actively monitor and/or control image capture of the images by the movable imaging assembly 550 from the controller module 600 while the movable imaging assembly 550 follows a second user or other object that is bearing the beacon module 650 passively while moving. This may enable following objects (e.g., animals) that are unable to issue commands to the movable imaging assembly 550 or make the experience of being followed more natural and less mentally taxing for the second user, so the second user can focus their attention on other activities (e.g., skiing, surfing, or mountain biking). The first user can focus on optimizing other aspects of image capture (e.g., choosing perspective on the subject, zooming, or timing snaps of still images) while autonomous functions of the movable imaging assembly 550 handle the following and navigation tasks.

Figure 6A:
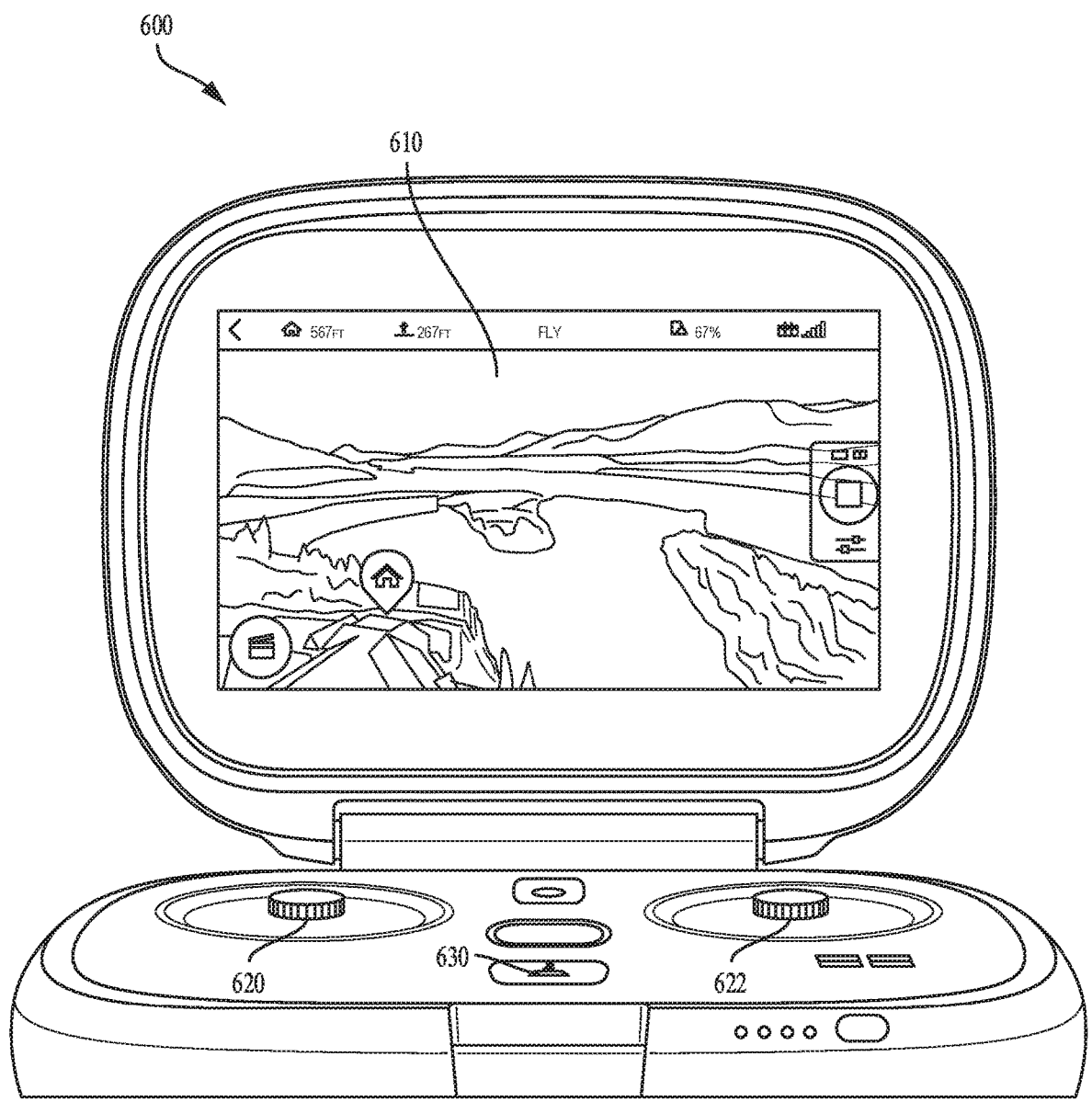
FIG. 6A is a pictorial illustration of an example of a controller module.

FIG. 6A is a pictorial illustration of an example of a controller module 600. The controller module 600 may be configured to wirelessly communicate with a movable imaging assembly (e.g., the movable imaging assembly 400 or the movable imaging assembly 550) to control motion of the movable imaging assembly and/or capture of images. The controller module 600 includes a display 610 configured to present images captured by the movable imaging assembly and status information for the movable imaging assembly. For example, the status information for the movable imaging assembly may include a battery remaining indicator, a video recording indicator, an encoding state (e.g., 4K video at 30 frames per second and a recording time), a flight mode (e.g., leash mode, mimic mode, or tripod mode), flight event notices, and/or user prompts. The display 610 may be a touch-screen display that enables the entry of commands (e.g., to select a subject/target for tracking from an image displayed on the display 610). The controller module 600 includes a left joystick 620 and a right joystick 622 for controlling motion of the movable imaging assembly and/or panning of an image sensor (e.g., the image sensor 210) using a mechanical stabilization system (e.g., the mechanical stabilization system 220) of the movable imaging assembly. The controller module 600 includes buttons 630 including, for example, a power button and a record button. The controller module 600 may also include a microphone for receiving voice commands to be relayed to the movable imaging assembly.

Figure 6B:
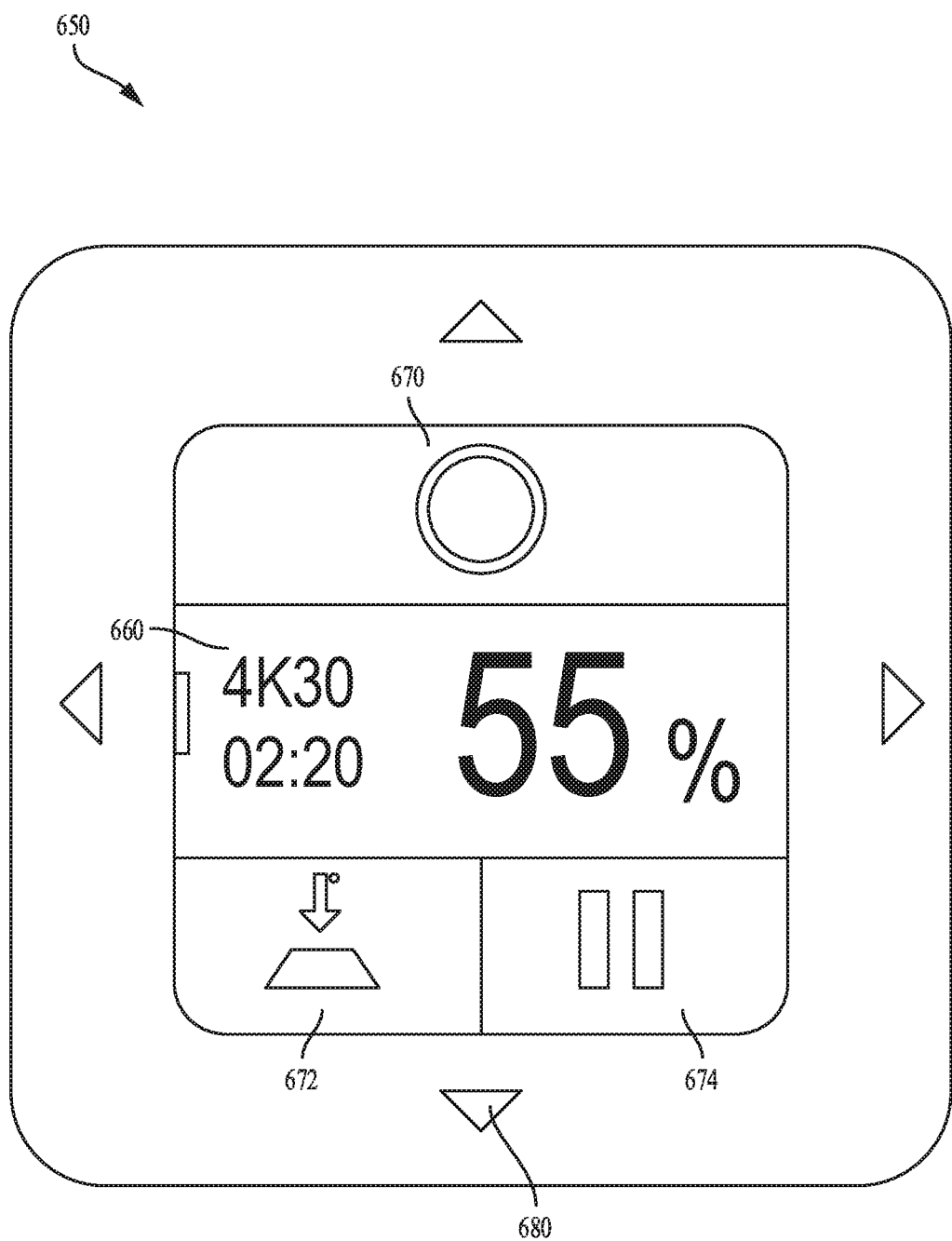
FIG. 6B is a pictorial illustration of an example of a beacon module.

FIG. 6B is a pictorial illustration of an example of a beacon module 650. The beacon module 650 may be configured to wirelessly transmit position data to a movable imaging assembly (e.g., the movable imaging assembly 400 or the movable imaging assembly 550) to enable the movable imaging assembly to follow the beacon module 650. The position data may be transmitted via a wireless communications link. For example, the beacon module 650 may include a location sensor, such as a GPS receiver and the position data may include GPS coordinates of the beacon module 650. In some implementations, beacon module 650 includes an inertial measurement unit (e.g., including accelerometers, gyroscopes, and/or magnetometers) and the position data includes changes in the position and/or orientation of the beacon module 650 that are sensed by the inertial measurement unit. For example, the wireless communications link may utilize a wireless interface standard, such as WiFi, Bluetooth (BT), cellular data link, ZigBee, or ANT+. The beacon module 650 may be waterproof and/or include a waterproof housing to enable users to bear the beacon module 650 in a variety of usage scenarios.

The beacon module 650 includes a user interface that allows a user to monitor status of the movable imaging assembly (e.g., the movable imaging assembly 400 or the movable imaging assembly 550) and/or issue some commands to the movable imaging assembly via the wireless communications link to cause the movable imaging assembly to move and/or capture images. The beacon module 650 includes a display 660 for presenting status information for the movable imaging assembly. For example, the status information for the movable imaging assembly may include a battery remaining indicator, a video recording indicator, an encoding state (e.g., 4K video at 30 frames per second and a recording time), a flight mode (e.g., leash mode, mimic mode, or tripod mode), flight event notices, and/or user prompts. The beacon module 650 includes a record button 670 to start and stop the capture of images. The beacon module 650 includes a take-off/land button 672 to instruct an aerial vehicle (e.g., the aerial vehicle 500) to take-off or land, depending on the current flight state. The beacon module 650 includes a "pause follow" button 674 to pause and resume a follow function (e.g., by entering or leaving a tripod follow mode where the movable platform maintains its current position, but may still track motions of a subject by panning with a mechanical stabilization system). The beacon module 650 includes buttons 680 for 3-D repositioning of the movable imaging assembly relative to the subject bearing the beacon module 650. The beacon module 650 may also include a microphone for receiving voice commands (e.g., "follow-me," "pause," and "record").

Figure 7B:
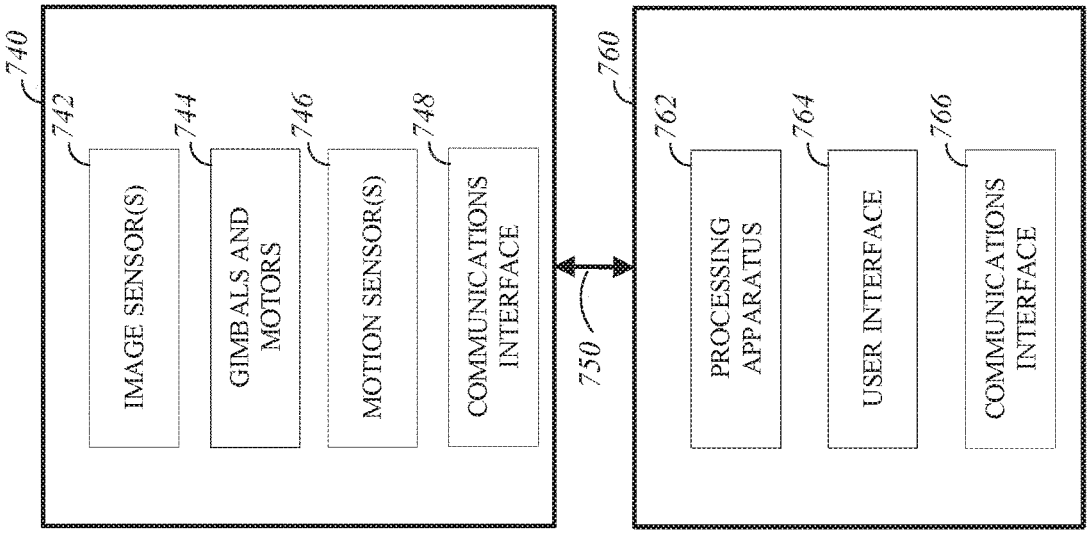
FIG. 7B is a block diagram of an example of a system configured for image capture.
Figure 7A:
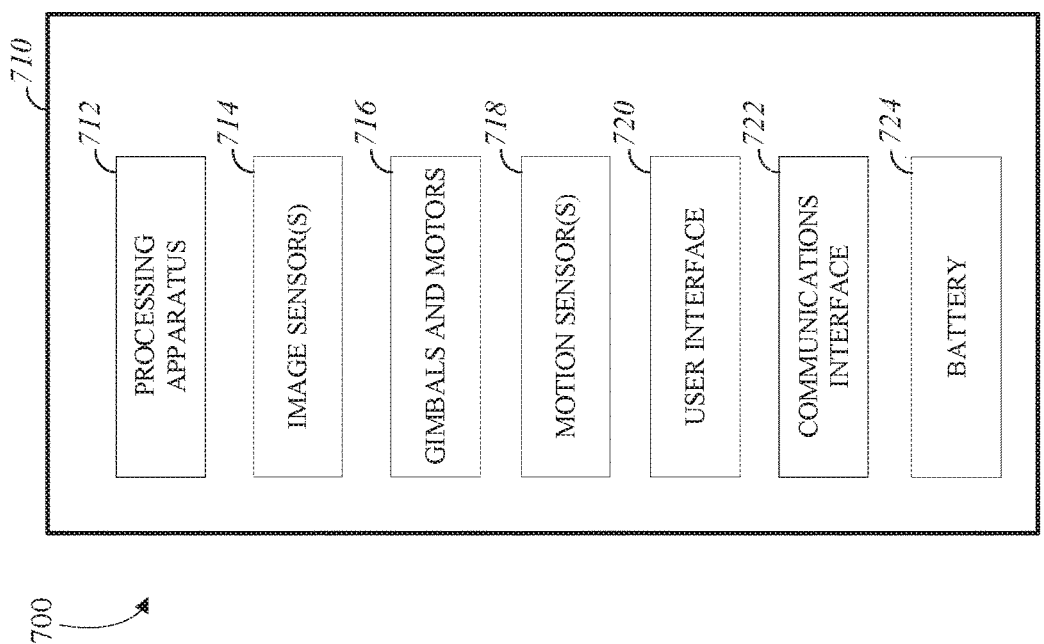
FIG. 7A is a block diagram of an example of a system configured for image capture.

FIG. 7A is a block diagram of an example of a system 700 configured for image capture. The system 700 includes an image capture device 710 (e.g., the movable imaging assembly 160 or the movable imaging assembly 162) that includes a processing apparatus 712 that is configured to receive images from one or more image sensors 714. The image capture device 710 includes gimbals and motors 716 that are actuators of a mechanical stabilization system configured to control an orientation of the one or more image sensors 714 (e.g., an orientation with respect to a movable platform). The gimbals and motors 716 may be controlled by a controller of the mechanical stabilization system, which may be implemented by the processing apparatus 712 (e.g., as a software module or a specialized hardware module). The processing apparatus 712 may be configured to perform image signal processing (e.g., filtering, tone mapping, stitching, electronic image stabilization, and/or encoding) to generate output images based on image data from the one or more image sensors 714. The image capture device 710 includes one or more motion sensors 718 configured to detect motion of the one or more image sensors 714. The one or more motion sensors 718 may provide feedback signals to the mechanical stabilization system. The image capture device 710 includes a communications interface 722 for transferring images to other devices and/or receiving commands or other control signaling. The image capture device 710 includes a user interface 720, which may allow a user to control image capture functions and/or view images. The image capture device 710 includes a battery 724 for powering the image capture device 710. For example, the system 700 may be used to implement processes described in this disclosure, such as the process 1700 of FIG. 17, the process 1800 of FIG. 18, and the process 1900 of FIG. 19.

The processing apparatus 712 may include one or more processors having single or multiple processing cores. The processing apparatus 712 may include memory, such as random access memory device (RAM), flash memory, or any other suitable type of storage device such as a non-transitory computer readable memory. The memory of the processing apparatus 712 may include executable instructions and data that can be accessed by one or more processors of the processing apparatus 712. For example, the processing apparatus 712 may include one or more DRAM modules such as double data rate synchronous dynamic random-access memory (DDR SDRAM). In some implementations, the processing apparatus 712 may include a digital signal processor (DSP). In some implementations, the processing apparatus 712 may include an application specific integrated circuit (ASIC). For example, the processing apparatus 712 may include a custom image signal processor. In some implementations, the processing apparatus 712 may have multiple processing units in different portions the image capture device 710. For example, the processing apparatus 712 may include a processor on a movable platform (e.g., the aerial vehicle 120, the handheld module 130, the handheld module 300, or the aerial vehicle 500) and a processor in an image capture module (e.g., the image capture module 110 or the image capture module 200) that are removably attached by a connector.

The one or more image sensors 714 are configured to capture images. The one or more image sensors 714 are configured to detect light of a certain spectrum (e.g., the visible spectrum or the infrared spectrum) and convey information constituting an image as electrical signals (e.g., analog or digital signals). For example, the one or more image sensors 714 may include charge-coupled devices (CCD) or active pixel sensors in complementary metal-oxide-semiconductor (CMOS). The one or more image sensors 714 may detect light incident through respective lens (e.g., a rectilinear lens or a fisheye lens). In some implementations, the one or more image sensors 714 include analog-to-digital converters. In some implementations, the one or more image sensors 714 have respective fields of view that overlap.

The mechanical stabilization system for the one or more image sensors 714 includes the gimbals and motors 716. The gimbals and motors 716 may be parts of a mechanical stabilization system (e.g., the mechanical stabilization system 220). The gimbals and motors 716 may attach the one or more image sensors 714 to a movable platform (e.g., the aerial vehicle 120 or the handheld module 130) via a connector (e.g., the connector 230) and control their orientation. The gimbals and motors 716 may span multiple axes (e.g., a 7-axis gimbal set with brushless direct current motors). The mechanical stabilization system may include a controller (e.g., a proportional integral derivative (PID) controller). For example, the controller of the mechanical stabilization system may be implemented by the processing apparatus 712 (e.g., as a software module or a specialized hardware module).

The one or more motion sensors 718 are configured to detect motion of the one or more image sensors 714. For example, the one or more motion sensors 718 may include parts of an inertial measurement unit (e.g., including gyroscopes, accelerometers, and/or magnetometers) that is mounted in a housing with the one or more image sensors 714. In some implementations, the one or more motion sensors 718 may include parts of an inertial measurement unit that is mounted in a movable platform (e.g., the aerial vehicle 120 or the handheld module 130) of the image capture device 710. In some implementations, the one or more motion sensors 718 includes sensors (e.g., magnetic encoders, optical encoders, and/or potentiometers) that detect the state of the gimbals and motors 716 to measure a relative orientation of the image sensor and a movable platform of the image capture device 710. For example, the one or more motion sensors 718 may include encoders configured to detect a position and orientation of the image sensor relative to a movable platform (e.g., the aerial vehicle 120 or the handheld module 130). The processing apparatus 712 may be configured to determine a sequence of orientation estimates based on sensor data from the one or more motion sensors 718. For example, determining the sequence of orientation estimates may include applying quadratic estimation to sensor data from a plurality of the one or more motion sensors 718. In some implementations, the motion sensors include a GPS receiver that generates GPS position data for the image capture device 710.

The image capture device 710 may include a user interface 720. For example, the user interface 720 may include an LCD display for presenting images and/or messages to a user. For example, the user interface 720 may include a touch-screen display for interactively displaying images and other data and receiving user commands. For example, the user interface 720 may include a microphone for receiving voice commands from a user. For example, the user interface 720 may include a button or switch enabling a person to manually turn the image capture device 710 on and off. For example, the user interface 720 may include a shutter button for snapping pictures.

The image capture device 710 may include a communications interface 722, which may enable communications with a personal computing device (e.g., a smartphone, a tablet, a laptop computer, or a desktop computer) and one or more specialized controllers (e.g., the controller module 140 and/or the beacon module 150). For example, the communications interface 722 may be used to receive commands controlling image capture and processing in the image capture device 710. For example, the communications interface 722 may be used to transfer image data to a personal computing device or a specialized controller controllers (e.g., the controller module 140). For example, the communications interface 722 may include a wired interface, such as a high-definition multimedia interface (HDMI), a universal serial bus (USB) interface, or a FireWire interface. For example, the communications interface 722 may include a wireless interface, such as a Bluetooth interface, a ZigBee interface, and/or a Wi-Fi interface.

The image capture device 710 may include a battery 724 that powers the image capture device 710 and/or its peripherals. For example, the battery 724 may be a detachable flight battery for an aerial vehicle. For example, the battery 724 may be a part of a handheld module. For example, the battery 724 may be charged wirelessly or through a micro-USB interface. In some implementations (not shown), the battery 724 may be replaced by another type of power supply (e.g., a capacitor that is charged by a circuit receiving power via an inductive coupling).

FIG. 7B is a block diagram of an example of a system 730 configured for image capture. The system 730 includes an image capture device 740 (e.g., the movable imaging assembly 160 or the movable imaging assembly 162) and a personal computing device 760 that communicate via a communications link 750. The image capture device 740 includes one or more image sensors 742 that are configured to capture images. The image capture device 740 includes a communications interface 748 configured to transfer images via the communication link 750 to the personal computing device 760. The personal computing device 760 includes a processing apparatus 762 that is configured to receive, using the communications interface 766, images from the one or more image sensors 742. The image capture device 740 includes gimbals and motors 744 that are actuators of a mechanical stabilization system configured to control an orientation of the one or more image sensors 742 (e.g., an orientation with respect to a movable platform). The gimbals and motors 744 may be controlled by a controller of the mechanical stabilization system, which may be implemented by the processing apparatus 762 (e.g., as a software module or a specialized hardware module) and provide control signals to the motors 744 via the communication link 750. The processing apparatus 762 may be configured to perform image signal processing (e.g., filtering, tone mapping, stitching, electronic image stabilization, and/or encoding) to generate output images based on image data from the one or more image sensors 742. The image capture device 740 includes one or more motion sensors 746 configured to detect motion of the one or more image sensors 742. The one or more motion sensors 746 may provide feedback signals (e.g., via communication link 750 or internally within the image capture device 740) to the mechanical stabilization system. For example, the system 730 may be used to implement processes described in this disclosure, such as the process 1700 of FIG. 17, the process 1800 of FIG. 18, and the process 1900 of FIG. 19.

The one or more image sensors 742 are configured to capture images. The one or more image sensors 742 are configured to detect light of a certain spectrum (e.g., the visible spectrum or the infrared spectrum) and convey information constituting an image as electrical signals (e.g., analog or digital signals). For example, the one or more image sensors 742 may include charge-coupled devices (CCD) or active pixel sensors in complementary metal-oxide-semiconductor (CMOS). The one or more image sensors 742 may detect light incident through respective lens (e.g., a rectilinear lens or a fisheye lens). In some implementations, the one or more image sensors 742 include analog-to-digital converters. In some implementations, the one or more image sensors 742 have respective fields of view that overlap.

The processing apparatus 762 may include one or more processors having single or multiple processing cores. The processing apparatus 762 may include memory, such as random access memory device (RAM), flash memory, or any other suitable type of storage device such as a non-transitory computer readable memory. The memory of the processing apparatus 762 may include executable instructions and data that can be accessed by one or more processors of the processing apparatus 762. For example, the processing apparatus 762 may include one or more DRAM modules such as double data rate synchronous dynamic random-access memory (DDR SDRAM). In some implementations, the processing apparatus 762 may include a digital signal processor (DSP). In some implementations, the processing apparatus 762 may include an application specific integrated circuit (ASIC). For example, the processing apparatus 762 may include a custom image signal processor.

The mechanical stabilization system for the one or more image sensors 742 includes the gimbals and motors 744. The gimbals and motors 744 may be parts of a mechanical stabilization system (e.g., the mechanical stabilization system 220). The gimbals and motors 744 may connect the one or more image sensors 742 to a movable platform and control their orientation. The gimbals and motors 744 may span multiple axes (e.g., a 7-axis gimbal set with brushless direct current motors). The mechanical stabilization system may include a controller (e.g., a proportional integral derivative (PID) controller). For example, the controller of the mechanical stabilization system may be implemented by the processing apparatus 762 (e.g., as a software module or a specialized hardware module). For example, the controller of the mechanical stabilization system may be implemented by a specialized hardware module integrated with the image capture device 740.

The one or more motion sensors 746 are configured to detect motion of the one or more image sensors 742. For example, the one or more motion sensors 746 may include parts of an inertial measurement unit (e.g., including gyroscopes, accelerometers, and/or magnetometers) that is mounted in a housing with the one or more image sensors 742. In some implementations, the one or more motion sensors 746 may include parts of an inertial measurement unit that is mounted in a movable platform (e.g., the aerial vehicle 120 or the handheld module 130) of the image capture device 740. In some implementations, the one or more motion sensors 746 include sensors (e.g., magnetic encoders, optical encoders, and/or potentiometers) that detect the state of the gimbals and motors 744 to measure a relative orientation of the image sensor and a movable platform of the image capture device 740. For example, the one or more motion sensors 746 may include encoders configured to detect a position and orientation of the image sensor relative to a movable platform (e.g., the aerial vehicle 120 or the handheld module 130). The processing apparatus 762 may be configured to determine a sequence of orientation estimates based on sensor data from the one or more motion sensors 746. For example, determining the sequence of orientation estimates may include applying quadratic estimation to sensor data from a plurality of the one or more motion sensors 746. In some implementations, the motion sensors 746 include a GPS receiver that generates GPS position data for the image capture device 740.

The communications link 750 may be a wired communications link or a wireless communications link. The communications interface 748 and the communications interface 766 may enable communications over the communications link 750. For example, the communications interface 748 and the communications interface 766 may include a high-definition multimedia interface (HDMI), a universal serial bus (USB) interface, a FireWire interface, a Bluetooth interface, a ZigBee interface, and/or a Wi-Fi interface. For example, the communications interface 748 and the communications interface 766 may be used to transfer image data from the image capture device 740 to the personal computing device 760 for image signal processing (e.g., filtering, tone mapping, stitching, and/or encoding) to generate output images based on image data from the one or more image sensors 742. For example, the communications interface 748 and the communications interface 766 may be used to transfer motion sensor data from the image capture device 740 to the personal computing device 760 for processing in a controller of a mechanical stabilization system. For example, the communications interface 748 and the communications interface 766 may be used to transfer control signals to the image capture device 740 from the personal computing device 760 for controlling the gimbals and motors 744 of a mechanical stabilization system and/or motion of an aerial vehicle of the image capture device 740.

The personal computing device 760 may include a user interface 764. For example, the user interface 764 may include a touchscreen display for presenting images and/or messages to a user and receiving commands from a user. For example, the user interface 764 may include a button or switch enabling a person to manually turn the personal computing device 760 on and off. In some implementations, commands (e.g., start recording video, stop recording video, snap photograph, or select tracking target) received via the user interface 764 may be passed on to the image capture device 740 via the communications link 750. The modular image capture systems described herein may address problems of older image capture systems. For example, discrete handheld camera and mechanical stabilizer systems can be large, heavy, not suitable for mounting, and may not inter-operate well with one-another. It can be difficult to view and touch a camera's touch LCD when the touch LCD is mounted in a mechanical stabilization system. Some handheld systems that use a discrete mechanical stabilizer may use multiple batteries. For example, discrete camera, stabilizer, aerial vehicle, and aerial vehicle battery systems can be large, heavy, and may not inter-operate well with one-another. These systems may have multiple batteries. These systems can be loud. It can be difficult to attach/detach propellers on such a system. Systems with quick release propellers can be confusing/difficult to attach/detach. Discrete aerial vehicle designs can be large, expensive, and have many discrete electronic parts, harnesses, boards, and interconnects. Some aerial vehicles may be unable to detect or log whether a battery is detached before it is powered off. Some flight batteries cannot detect or log whether they have been disconnected during operation. On the other hand, some fully integrated image capture systems cannot be used for all desired usage scenarios, including handheld, flight, and mounted use cases.

The proposed architectures address some of these problems with a an image capture module including a camera integrated with a stabilizer, a handheld module (e.g., a grip) with electronics and mechanical parts that are primarily utilized for the handheld use case, and a separate aerial vehicle and flight battery. The image capture module is implemented with few electronics and optics (e.g., lens, image sensor, microphones, and LEDs) located in a head portion on an outer axis of the stabilizer. This enables the head (stabilizer payload) to be as small and light, which reduces the size and mass of the stabilizer as well. The head (stabilizer payload) sends all signals and power through the stabilizer to a base of the image capture module where an image signal processor, memory, buttons, LEDs, power management, USB external interface, GPS, WiFi, and Bluetooth systems are located. The handheld module (e.g., a grip) integrates a touch LCD that is easy to view and touch in the handheld use case and is not needed in the flight use case (e.g., could add extra size and mass without adding utility). A speaker, LEDs, and buttons are placed on the handheld module to facilitate use in handheld usage scenarios. The aerial vehicle may integrate all of its subsystems with a single system on a Chip (SoC). The aerial vehicle logging subsystem may have the ability to log essential power rails and battery disconnect in complete power loss. The flight battery may be configured to detect and log battery disconnect, power rails, and critical failures.

Some implementations, for a handheld use case, include a handheld module (e.g., a grip) attached to an image capture module that includes a camera and an integrated mechanical stabilization system (e.g., including gimbals and motors). Using an integrated camera and stabilizer may enable consolidation of electronics, reduce overall volume, reduce overall mass, reduce overall cost, and/or reduce electronic complexity. For example, compared to some older image capture systems, one battery may be removed, two microcontrollers may be removed, and one inertial measurement unit (IMU) may be removed. Many electronic and mechanical interfaces may be removed. Motors may be integrated into the arms of a mechanical stabilization system, further reducing mass, volume, and cost. In some implementations, the outer stabilizer axis contains only the minimum electronics required to operate the camera (e.g., including a lens, an image sensor, a sensor PCB, microphones, an IMU, and/or an interconnect to the base). The sensor, IMU, and microphone data may be routed back to the base to be processed. The three axes of the mechanical stabilization system may include respective position sensors and motor controllers. For example, the motor controller may be simplified by performing only the lowest level of motor control while receiving commands from the base which computes higher level controls. A base of the image capture module may contain an integrated image sensor processor (ISP) and stabilizer controller. The ISP may include many peripherals such as power subsystem, RAM, Flash, WiFi, Bluetooth, GNSS, magnetometer, removable SD card, Type-C external interface, HDMI external interface.

Some implementations, for a flight usage scenario, may include an aerial vehicle, a flight battery, an image capture module including an integrated mechanical stabilization system, and a controller module configured to wirelessly control image capture using the image capture module attached to the aerial vehicle. For example, the aerial vehicle may integrate the following hardware subsystems with a single SoC: visual positioning system, peripheral ranging system, stereo vision system, low latency video encoding, long range wireless, and/or flight controller. A single SoC implements integrated software for inertial and visual localization; downward, forward, and peripheral, object detection; downward, forward, and peripheral object avoidance; object tracking; and/or mapping.

In some implementations, additional devices may be included in these image capture systems (e.g., the movable imaging system 100 of FIGS. 1A and 1B). Other devices that are compatible may include: a small battery powered mount, a large unmanned aerial vehicle (e.g., larger than the aerial vehicle 500 of FIG. 5A), and an autonomous ground vehicle.

In some implementations, other image capture modules may be included that are compatible with handheld modules (e.g., the handheld module 300 of FIG. 3A) and aerial vehicles (e.g., the aerial vehicle 500 of FIG. 5A) describe above. For example, additional compatible image capture modules may be provided that include: a 360 degree field of view camera, a 180 degree field of view camera, an infrared camera, a multi-spectral camera, a radar system, a narrow field of view camera, and/or a measurement, illumination, or spotting device. These additional image capture devices may be swapped in/out to suit a particular usage scenario.

Figure 8:
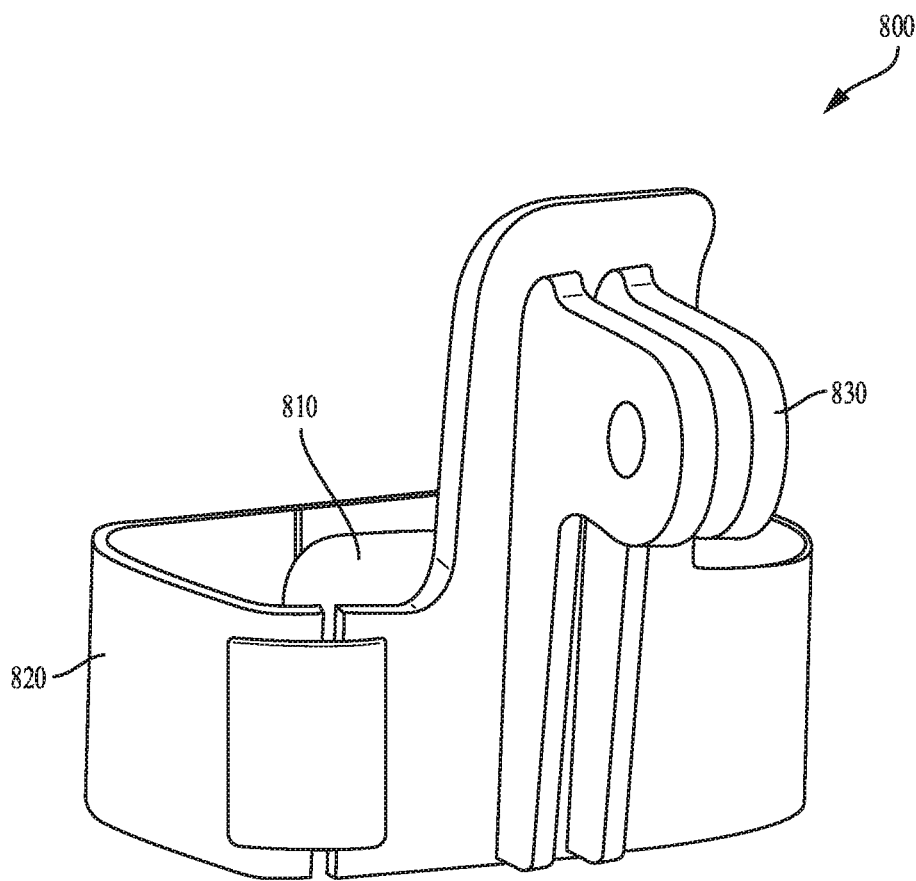
FIG. 8 is a pictorial illustration of an example of a mounting bracket.

FIG. 8 is a pictorial illustration of an example of a mounting bracket 800. The mounting bracket 800 is configured to hold a handheld movable imaging assembly (e.g., the movable imaging assembly 400) to enable hands-free image capture. The mounting bracket 800 includes a space 810 for a handheld module to be inserted in, where it can be secured by a hinged strap 820 of the mounting bracket 800. The mounting bracket 800 includes mounting tabs 830 with holes in them. For example, a string, a cable, or a screw can be inserted through the holes of the mounting tabs 830 and used to fasten the mounting bracket 800 to a person or object to enable image capture from the vantage point of the person or object. For example, the mounting bracket 800 may be fastened to a person's chest or arm while they are engaged in a sporting activity (e.g., snowboarding or biking).

Figure 9:
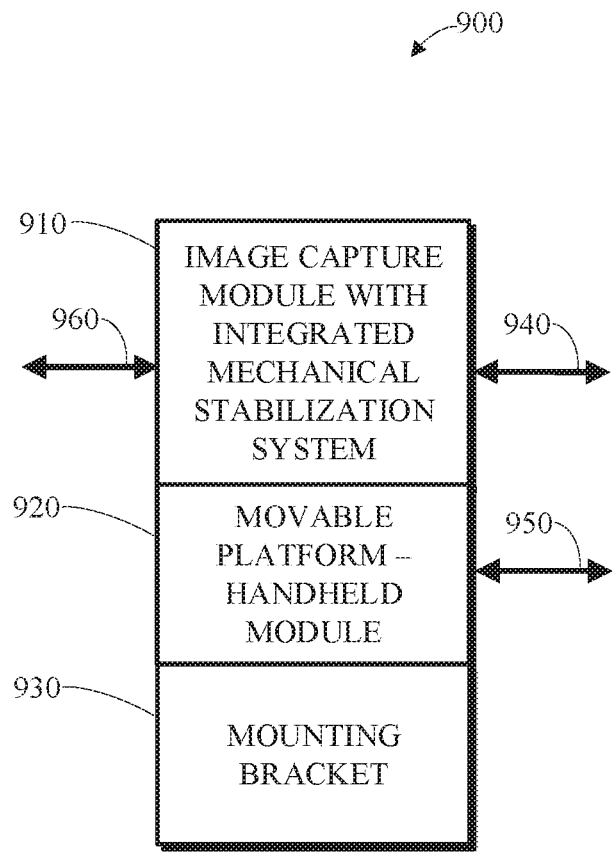
FIG. 9 is a block diagram of an example of a movable imaging system with modular components in a mounted usage scenario.

FIG. 9 is a block diagram of an example of a movable imaging system 900 with modular components in a mounted usage scenario. The movable imaging system 900 includes an image capture module 910 with an integrated mechanical stabilization system and an image sensor. For example, the image capture module 910 may be the image capture module 110 of FIGS. 1A and 1B and/or the image capture module 200 of FIGS. 2A and 2B. The movable imaging system 900 includes a handheld module 920 removably attached to image capture module 910. For example, the handheld module 920 may be the handheld module 130 of FIGS. 1A and 1B and/or the handheld module 300 of FIGS. 3A and 3B. The movable imaging system 900 includes a mounting bracket 930 that holds the handheld module 920 for fastening the movable imaging system 900 in place on a person or object. For example, the mounting bracket 930 may be the mounting bracket 800 of FIG. 8. The movable imaging system 900 may include a number of interfaces for communicating with external devices (e.g., to output images and/or to receive commands). In this example, the movable imaging system 900 includes a uHDMI interface 940 for transmitting digital audio & 4k60 video out; a USB type-C interface 950 for USB 3.0 data exchange and charging of the handheld module 920; and wireless interface 960 (e.g., a WiFi and/or Bluetooth interface) to connect to networks and personal computing devices (e.g., Android and/or iOS devices).

Figure 10:
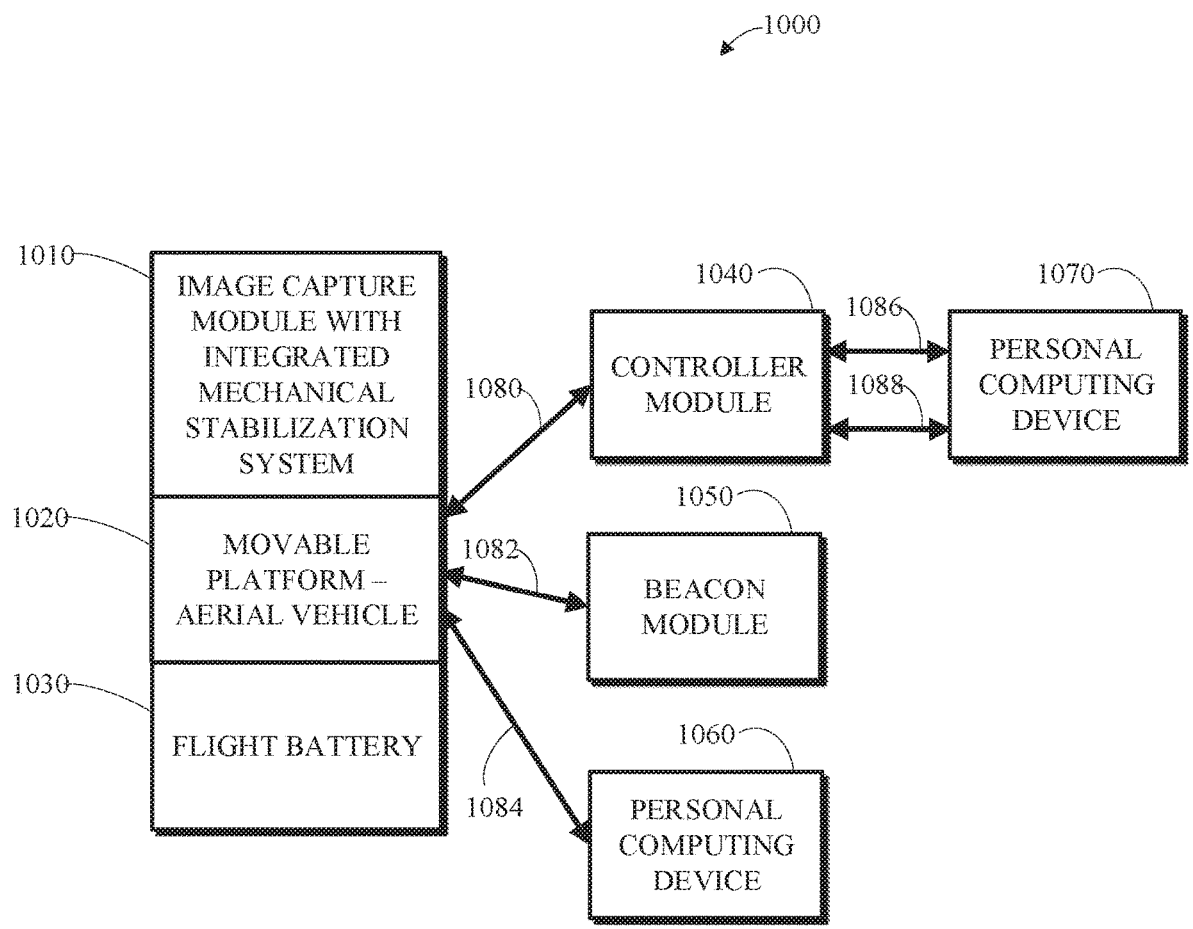
FIG. 10 is a block diagram of an example of a movable imaging system with modular components in a flight enabled usage scenario.

FIG. 10 is a block diagram of an example of a movable imaging system 1000 with modular components in a flight enabled usage scenario. The movable imaging system 1000 includes an image capture module 1010 with an integrated mechanical stabilization system and an image sensor. For example, the image capture module 1010 may be the image capture module 110 of FIGS. 1A and 1B and/or the image capture module 200 of FIGS. 2A and 2B. The movable imaging system 1000 includes an aerial vehicle 1020 removably attached to image capture module 1010. For example, the aerial vehicle 1020 may be the aerial vehicle 120 of FIG. 1A and 1B and/or the aerial vehicle 500 of FIG. 5A. The movable imaging system 1000 includes a flight battery 1030 that is inserted in the aerial vehicle 1020 and provides power to the aerial vehicle 1020. The movable imaging system 1000 includes a controller module 1040 configured to control the aerial vehicle 1020 at a distance via a long range wireless interface 1080 between the controller module 1040 and the aerial vehicle 1020 for the transfer of video, data, and control signals. For example, the controller module 1040 may be the controller module 140 of FIGS. 1A and 1B and/or the controller module 600 of FIG. 6A. The movable imaging system 1000 includes a beacon module 1050 configured to wirelessly communicate with the aerial vehicle 1020 via a medium range wireless interface 1082 for data, control, and optionally video data to enable the aerial vehicle 1020 to follow the beacon module 1050. For example, the beacon module 1050 may be the beacon module 150 of FIGS. 1A and 1B and/or the beacon module 650 of FIG. 6B. The movable imaging system 1000 includes a personal computing device 1060 (e.g., smart phone, a tablet, or a laptop) configured to wirelessly communicate with the aerial vehicle 1020 via a short range WiFi interface 1084 of the aerial vehicle 1020 for control, data, and video transfer. For example, the personal computing device 1060 may be an Android or iOS device. The movable imaging system 1000 includes a personal computing device 1070 (e.g., smart phone, a tablet, or a laptop) configured to wirelessly communicate with the controller module 1040 for control signal and data transfer. For example, the personal computing device 1060 may be an Android or iOS device. The controller module 1040 may include a WiFi and/or Bluetooth interface 1086 for connecting to networks and Android or iOS devices. The controller module 1040 may include serial port interface 1088 (e.g., a USB Type-C interface) to enable USB 2.0 data transfer to the personal computing device 1070 and charging of the controller module 1040.

Figure 11:
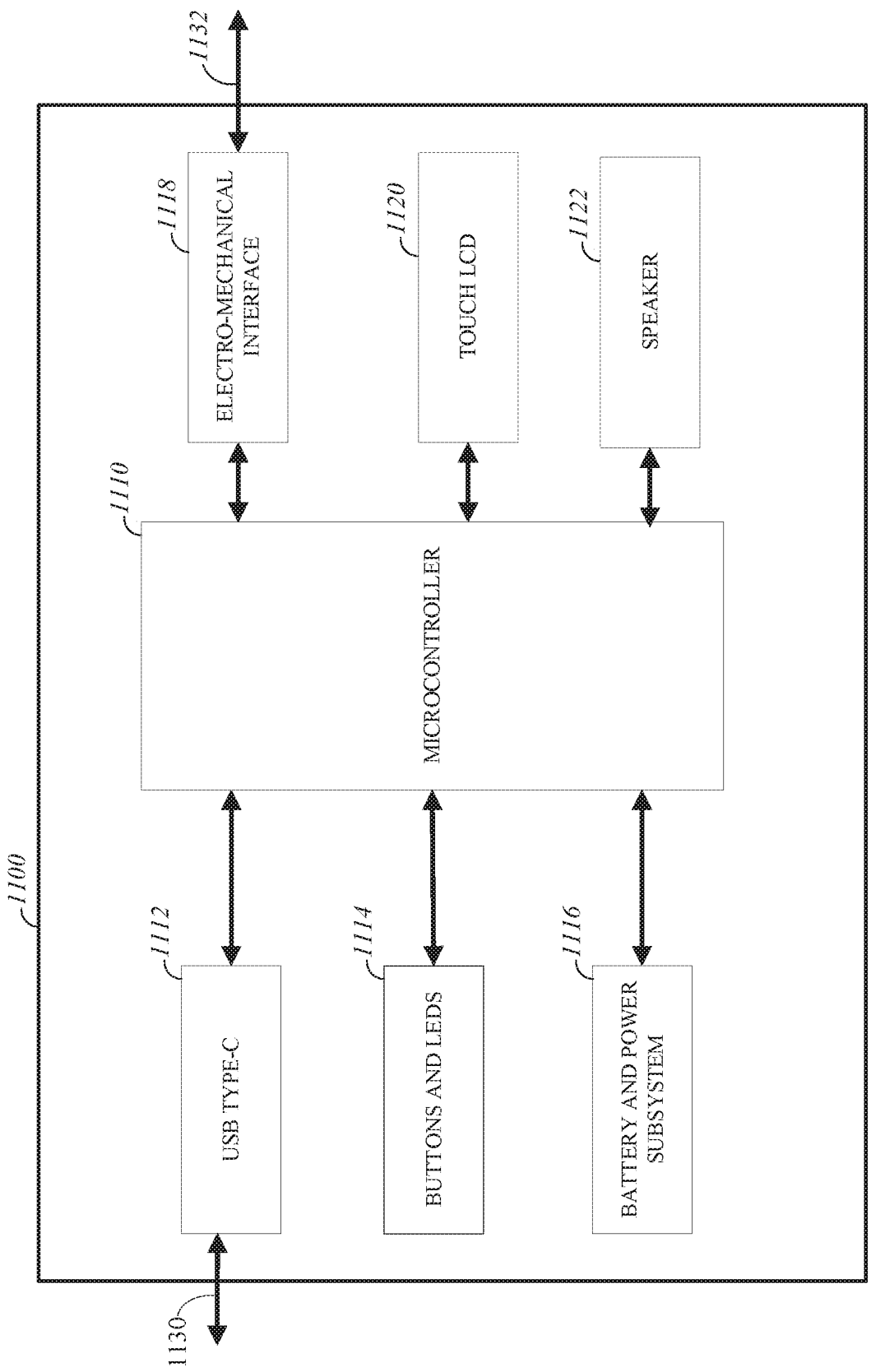
FIG. 11 is a block diagram of an example of a handheld module.

FIG. 11 is a block diagram of an example of a handheld module 1100. The handheld module 1100 includes a microcontroller 1110; a USB type-C interface 1112; buttons and LEDs 1114; a battery and power subsystem 1116; an electromechanical interface 1118; a touch liquid crystal display (LCD) 1120; and a speaker 1122. The electro-mechanical interface 1118 is configured to removably attach the handheld module 1100 to an image capture module (e.g., the image capture module 110). The electro-mechanical interface 1118 may provide improved latching and release of an image capture module (e.g., a camera with integrated stabilizer). When attached to an image capture module (e.g., the image capture module 1200), the handheld module 1100 may form a communication link 1132 (e.g., including USB 3.0, I2C, SPI, and/or MIPI signals) to the image capture module via the electro-mechanical interface 1118. This may provide higher data transfer rates between the image capture module and the handheld module 1100 than were available in some older systems. The electro-mechanical interface 1118 may also enable the supply of power from the battery and power subsystem 1116 to an attached image capture module (e.g., the image capture module 200) via conductors of the electro-mechanical interface 1118. The USB type-C interface 1112 may enable connection of the handheld module 1100 to an external computing device (e.g., a laptop or tablet) for fast data transfers via a communication link 1130 (e.g., using USB 3.0 signals) and charging of the battery and power subsystem 1116. The touch LCD 1120 may be easier to view and touch as positioned on the handheld module 1100 than touch LCDs of some older systems that are integrated with a camera in the payload of mechanical stabilization system. The touch LCD 1120 may be a display that is configured to present images captured by the image capture module and received from the image capture module 1200 via the communication link 1132. The touch LCD 1120 may be configured to enable input of commands by a user. For example, a user may input commands via the touch LCD 1120 to change a gimbal angle; enter "selfie-mode," or "HiLight Tag". For example, the touch LCD 1120 may be configured to detect a gesture to enable a user to generate portions of a video data temporally and/or spatially by specifying an object or other portions of a frame as frames are presented on the touch LCD 1120. By locating the touch LCD 1120 on the handheld module 1100 instead of in an attached image capture module, the touch LCD 1120 may be omitted from other movable imaging assemblies (e.g., the movable imaging assembly 160) in the flight or minimal mounted use cases to reduce size and weight of the assemblies for those usage scenarios. In some implementations, the speaker 1122 may be placed on the handheld module 1100 (e.g., a grip) to enhance sound projection for particular use cases (e.g., while the handheld module is held in a hand or resting on a table top). In some implementations, the buttons and LEDs 1114 are placed on the handheld module 1100 (e.g., a grip) such that unnecessary redundancy is eliminated, resulting in fewer total buttons and LEDs than are needed in some older image capture systems.

For example, the handheld module 130 of FIGS. 1A-1B may include components of the handheld module 1100. For example, the handheld module 300 of FIG. 3A may include components of the handheld module 1100 (e.g., the display 310 may include the touch LCD 1120 and/or the slot 340 may include the electro-mechanical interface 1118).

Figure 12:
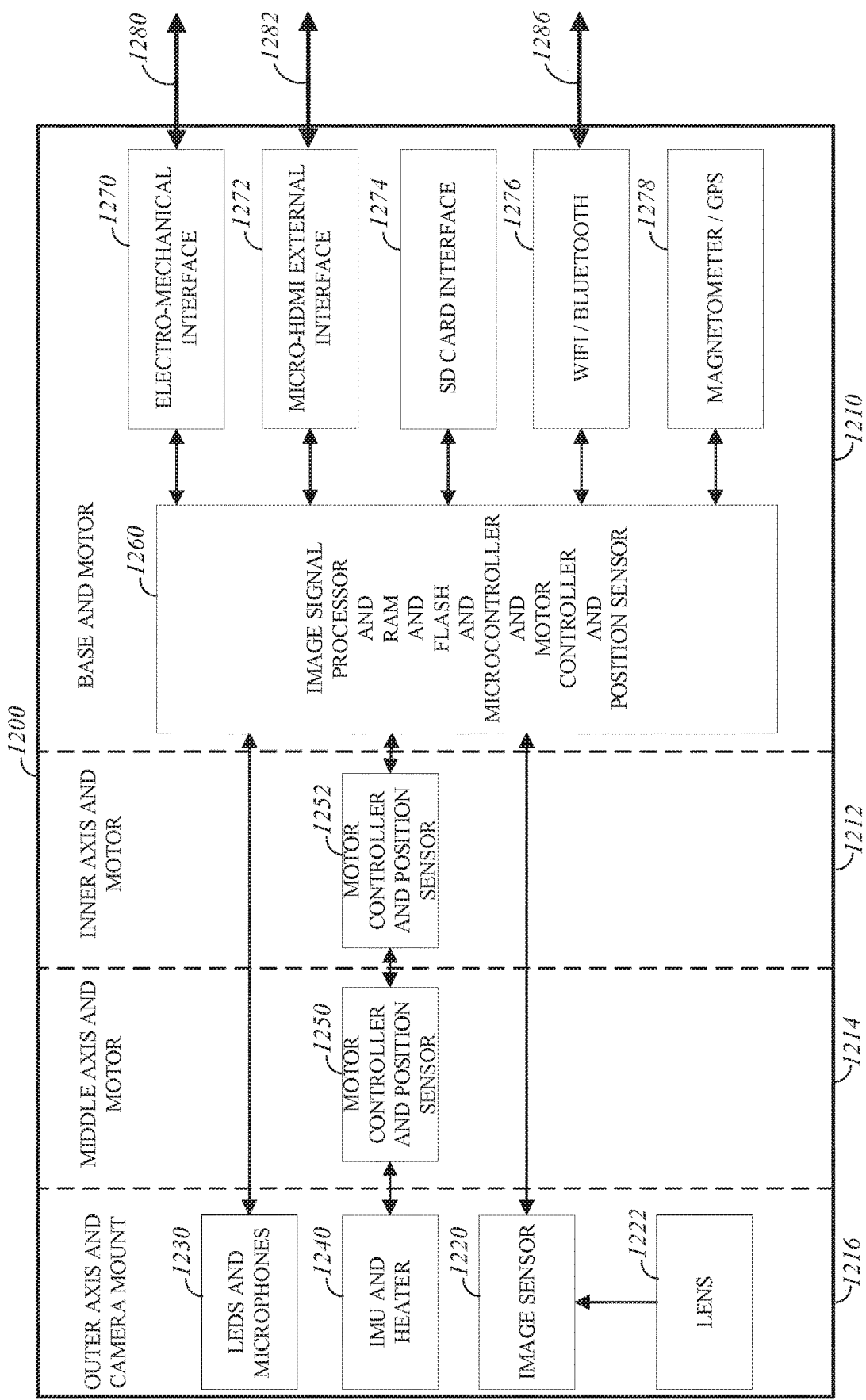
FIG. 12 is a block diagram of an example of an image capture module with an integrated mechanical stabilization system.

FIG. 12 is a block diagram of an example of an image capture module 1200 with an integrated mechanical stabilization system (e.g., including gimbals and motors) that is configured to control an orientation of an image sensor. In order to provide mechanical stabilization of the image sensor, the image capture module 1200 includes four portions that can move in relation to each other: a base 1210 with a first motor; an inner axis 1212 with a second motor; a middle axis 1214 with a third motor; and an outer axis 1216 with a camera mount (e.g., a payload of the integrated mechanical stabilization system). The outer axis 1216, which may be referred to as a head of the image capture module 1200, includes an image sensor 1220 configured to capture images and a lens 1222 (e.g., a fisheye lens or a rectilinear lens) that admits light incident to the image sensor 1220 to facilitate the capture of images. The outer axis 1216 includes LEDs and microphones 1230 for displaying status information and recording sound for corresponding images (e.g., video). The outer axis 1216 includes an inertial measurement unit (IMU) 1240 with a heater. The middle axis 1214 includes a motor controller 1250 with a position sensor (e.g., including a proportional integral derivative (PID) controller and an optical encoder) configured to measure and control the relative orientation of the outer axis 1216 with respect to the middle axis 1214. The inner axis 1212 includes a motor controller 1252 with a position sensor (e.g., including a PID controller and an optical encoder) configured to measure and control the relative orientation of the inner axis 1212 with respect to the middle axis 1214.

The base 1210 includes a processing apparatus 1260 and a connector configured to interchangeably connect the mechanical stabilization system to an aerial vehicle (e.g., the aerial vehicle 120) and a handheld module (e.g., the handheld module 130). The processing apparatus 1260 may be configured to send commands to motor controllers (e.g., the motor controller 1250 or the motor controller 1252) of the mechanical stabilization system. The processing apparatus 1260 may include an image signal processor that is configured to receive image data from the image sensor 1220. The processing apparatus 1260 may also include a random access memory (RAM), a flash memory, a microcontroller, and a motor controller and position sensor (e.g., including a PID controller and an encoder) configured to measure and control the relative orientation of the inner axis 1212 with respect to the base 1210.

The base 1210 includes an electro-mechanical interface 1270 configured to removably attach the image capture module 1200 to a handheld module (e.g., the handheld module 1100), an aerial vehicle (e.g., the aerial vehicle 1300), or another movable platform. The electro-mechanical interface 1270 may provide improved latching and release of the image capture module 1200 from a movable platform (e.g., the aerial vehicle 120 or the handheld module 130). When attached to a movable platform, the image capture module 1200 may form a communication link 1280 (e.g., including USB 3.0, I2C, SPI, and/or MIPI signals) to the movable platform via the electro-mechanical interface 1270. This may provide higher data transfer rates between the image capture module 1200 and the handheld module or other movable platform than were available in some older systems. The electro-mechanical interface 1270 may also enable the supply of power from a battery of an attached movable platform to the attached image capture module 1200 via conductors of the electro-mechanical interface 1270.

The base 1210 includes a micro-HDMI interface 1272 configured to provide an HDMI link 1282 for transferring video signals to an external device (e.g., a computer or a television). The base 1210 includes an SD card interface 1274 for accessing a removable memory card for storing image data. The base 1210 includes one or more wireless interfaces 1276 (e.g., a WiFi interface and/or a Bluetooth interface) for establishing a wireless communication link 1286 with an external computing device (e.g., a smartphone, a tablet, or a laptop). The base 1210 includes position and orientation sensors 1278 (e.g., including a magnetometer and/or a global positioning system (GPS) receiver) that may be configured to determine a global position and orientation of the image capture module 1200.

The processing apparatus 1260 located in the base 1210 may control and receive data from electronic components on the outer axis 1216 in order to reduce the amount of electronics on the outer axis 1216 to reduce the size and weight of the head portion of the image capture module 1200 that is a payload of the integrated mechanical stabilization system. For example, the mechanical stabilization system may include an outer axis 1216 that is attached to the image sensor 1220, a motion sensor (e.g., the IMU 1240), and a microphone 1230. In some implementations, the processing apparatus 1260 is configured to receive data from a motion sensor (e.g., the IMU 1240) and data from the microphone 1230 via conductors routed through the mechanical stabilization system.

The architecture of the image capture module 1200 may offer advantages over some older image capture systems. For example, integrating a camera and stabilizer may enable consolidation of electronics, reducing overall volume, overall mass, overall cost, and/or electronic complexity of the combination of the image sensor and the image stabilization system. Using this architecture a camera battery may be omitted from the image capture module 1200 and the image capture module can instead draw power via the electro-mechanical interface 1270 in various usage scenarios. A number of microcontrollers included in an overall image capture system may be reduced relative to older systems (e.g., two micro controllers may be removed) due to system integration. In some implementations, fewer motion sensors are needed to enable the mechanical image stabilization system (e.g., an inertial measurement unit may be removed due to system integration). Many electronic and mechanical interfaces may be removed relative to some older systems. Motors may be integrated into the arms of the mechanical stabilization system to further reduce mass, volume, and cost. In some implementations, the outer axis 1216 contains only a reduced set of electronics required to operate the camera (e.g., including the lens 1222, image sensor 1220, sensor PCB, microphones 1230, IMU 1240, and interconnect to the base 1210). For example, all of the image sensor 1220, IMU 1240, and microphone 1230 data may be routed back to the base 1210 to be processed by an image signal processor of the processing apparatus 1260. The motor controller 1250 may be simplified by performing only the lowest level of motor control while receiving commands from the processing apparatus 1260 in the base 1210, which computes higher level controls. A magnetometer and GPS may be added and utilized for improved stabilization. The mechanical stabilization system can be configured to turn back for selfie use case. The mechanical stabilization system can be configured to turn sideways for portrait mode. In some implementations, the mechanical stabilization system can be configured to fold flat for stowing. Combining the camera and stabilizer adds ability to implement in software detection and tracking of subjects (e.g., people or objects).

Figure 13:
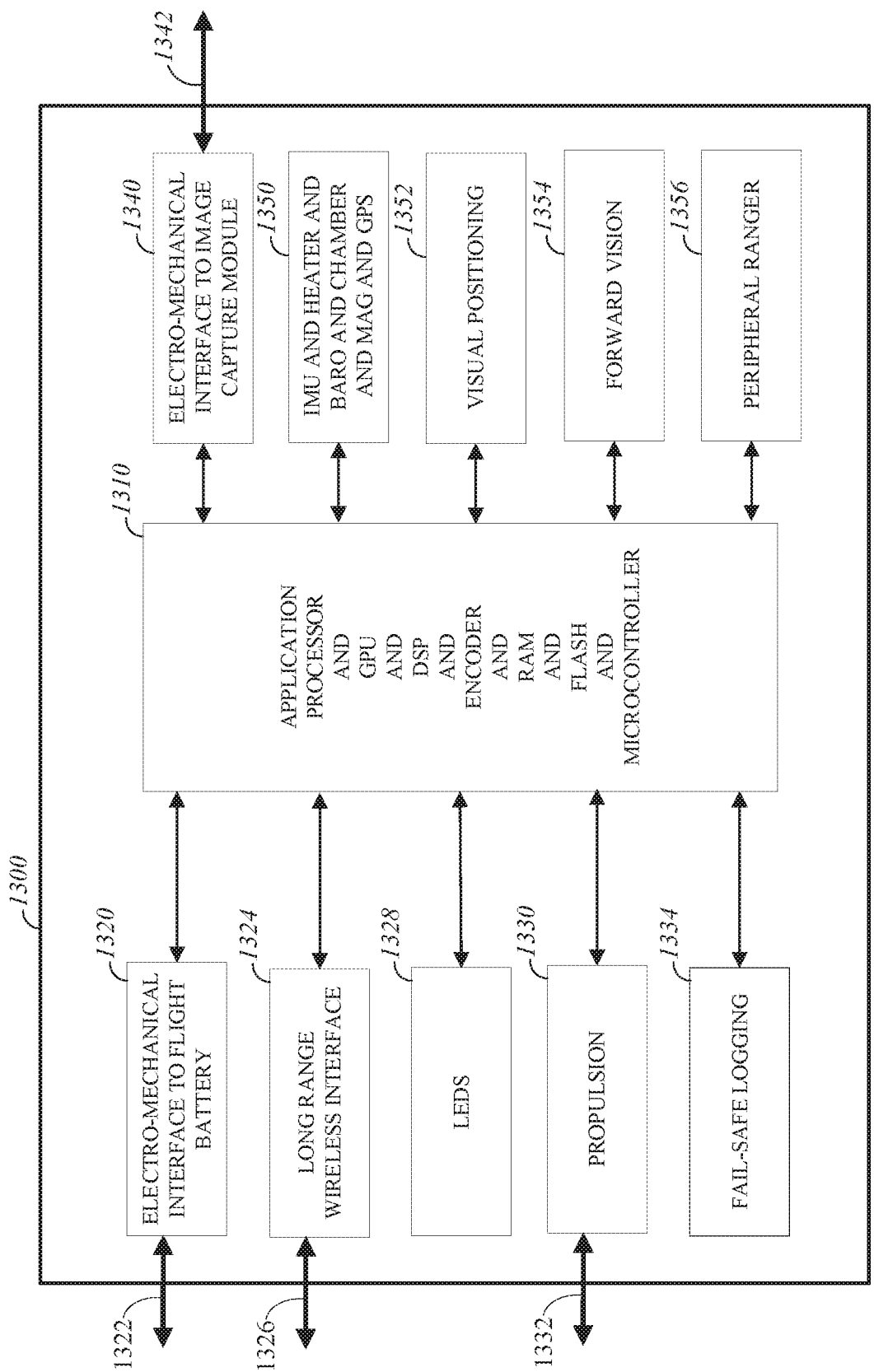
FIG. 13 is a block diagram of an example of an aerial vehicle.

FIG. 13 is a block diagram of an example of an aerial vehicle 1300. The aerial vehicle 1300 includes: a processing apparatus 1310, an electro-mechanical interface 1320 to a flight battery; a long range wireless interface 1324; LEDs 1328; a propulsion system 1330; a fail-safe logging system 1334; an electro-mechanical interface 1340 to an image capture module; motion sensors 1350; a visual positioning system 1352, a forward vision system 1354; and a peripheral ranger 1356. For example, the aerial vehicle 1300 may be the aerial vehicle 120 of FIGS. 1A and 1B. For example, the aerial vehicle 1300 may be the aerial vehicle 500 of FIG. 5A.

The processing apparatus 1310 may include an application processor, a graphics processing unit (GPU), a digital signal processor (DSP), an encoder, random access memory (RAM), flash memory, and/or a microcontroller. In some implementations, the combination of an application processor with improved GPU and DSP are used to enable software development of new features (e.g., localization, mapping, advanced control, avoidance, autonomy, and subject tracking). For example, the components of the processing apparatus 1310 may be implemented on a single system on a chip (SoC). In some implementations greater system integration is achieved such that all processing is done on the main application processor and microcontroller of the processing apparatus 1310.

The electro-mechanical interface 1320 may be used to removably attach a flight battery (e.g., the flight battery 1400) to the aerial vehicle 1300. Aerial vehicle 1300 may draw power from the flight battery via conductors in the electro-mechanical interface 1320 during flight or other operations. The electro-mechanical interface 1320 may be improved relative to older systems to have a dual-independent positive latches for improved fail-safety. The electro-mechanical interface 1320 may be configured such that the flight battery is top loading, which allows the flight battery to naturally stay seated during normal operation. A communication link 1322 (e.g., a USB or other serial port link) may be established between the flight battery and the processing apparatus 1310 via conductors of the electro-mechanical interface 1320 to enable the transfer of status and control signals.

Information (e.g., control signals and/or image data) may be transferred between the aerial vehicle 1300 and a controller module (e.g., the controller module 1500) via a wireless link 1326. For example, the wireless link 1326 may utilize a wireless interface standard, such as WiFi, Bluetooth (BT), cellular data link, ZigBee, ANT+ link, and/other wireless protocols. For example, images (e.g., still images or video at full resolution or at reduced resolution) captured by an image capture module attached via the electro-mechanical interface 1340 may be received by a controller module (e.g., the controller module 600) and displayed on a touch-screen display to the user. In some implementations, the aerial vehicle 120 is configured to communicate wirelessly with both a beacon module (e.g., the beacon module 150) and a controller module (e.g., the controller module 140). The long range wireless interface 1324 may be improved relative to older systems to enable longer range and higher resilience to noise.

The LEDs 1328 may be position on the outside of the aerial vehicle and configured to indicate to distant user the orientation and status of the aerial vehicle 1300.

The propulsion system 1330 may include a no-twist, quick-release propeller interface 1332. The propellers of the aerial vehicle 1300 may be low mass to operate with high efficiency and low noise. In some implementations, the propellers may be configured for folding and/or quick release.

The fail-safe logging system 1334 may add an ability to log battery pull as well as critical power rails.

The electro-mechanical interface 1340 is configured to removably attach the aerial vehicle 1300 to an image capture module (e.g., the image capture module 110). The electro-mechanical interface 1340 may provide improved latching and release of an image capture module (e.g., a camera with integrated stabilizer). When attached to an image capture module (e.g., the image capture module 1200), the aerial vehicle 1300 may form a communication link 1342 (e.g., including USB 3.0, I2C, SPI, and/or MIPI signals) to the image capture module via the electro-mechanical interface 1340. This may provide higher data transfer rates between the image capture module and the aerial vehicle 1300 than were available in some older systems. The electro-mechanical interface 1340 may also enable the supply of power from the flight battery to an attached image capture module (e.g., the image capture module 200) via conductors of the electro-mechanical interface 1340.

The motion sensors 1350 may include an inertial measurement unit (IMU) with a heater, a barometer in a chamber, a magnetometer, and/or a GPS receiver. For example, a heater may be added to the IMU, which may improve flight stability. In some implementations, IMU redundancy is added to the motion sensors 1350 to improve fail-safety. For example, a chamber may be added around the barometer, which may improve flight stability.

The visual positioning system 1352 may determine position estimates based on captured images from an image capture module attached via the electro-mechanical interface 1340. The forward vision system 1354 may provide software with an ability to implement object detection, avoidance, mapping, and/or tracking. The peripheral ranger 1356 may provide software with an ability to implement object detection and avoidance.

The aerial vehicle 1300 may offer advantages over some older image capture systems for flight usage scenarios. For example, a total mass (all up) of the aerial vehicle 1300 with an attached image capture module (e.g., the image capture module 1200) and an attached flight battery (e.g., the flight battery 1400) may be reduced compared to older systems (e.g., from 1945 g to 899 g). Reducing the mass of this imaging assembly may enable improvements in flight time, improvements in safety, and improvements in portability. The aerial vehicle 1300 may be less intimidating and less noisy than some older systems. In some implementations, one or more buttons that were needed in older systems may be omitted due to integration with flight battery.

Figure 14:
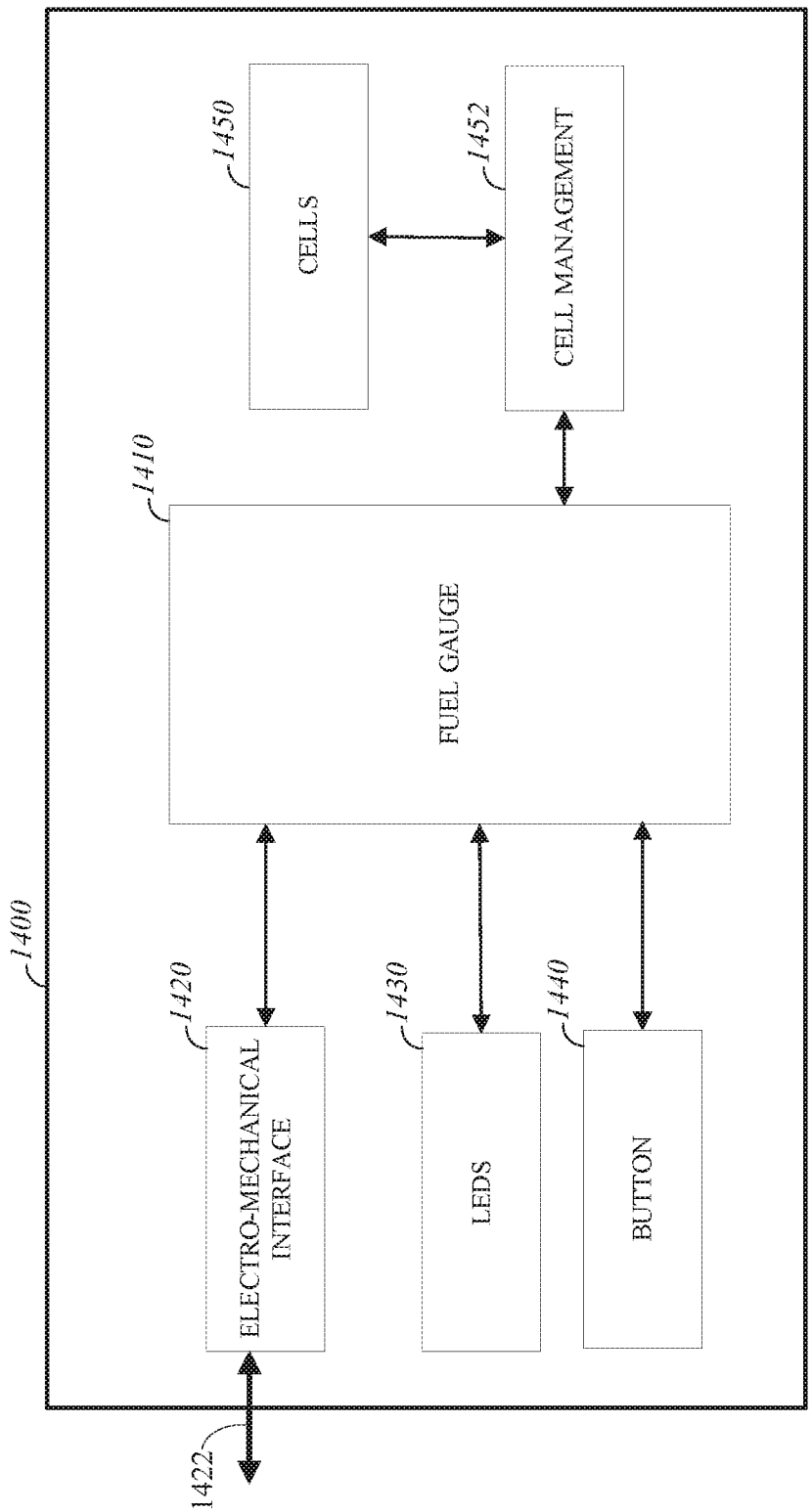
FIG. 14 is a block diagram of an example of a flight battery.

FIG. 14 is a block diagram of an example of a flight battery 1400. The flight battery 1400 includes a fuel gauge 1410; an electro-mechanical interface 1420; LEDs 1430; a button 1440; cells 1450 configured to store energy; and a cell management system 1452. The fuel gauge 1410 may be implemented as a single integrated circuit (IC). In some implementation, a microcontroller may be omitted relative to older systems due to greater system integration onto the fuel gauge IC. The fuel gauge 1410 may implement an elliptic curve cryptographic hash for improved battery authentication. This cryptographic hash may be improved relative to some older systems, enabling an improvement of battery authentication. For example, the fuel gauge 1410 may implement a fail-safe logging system to detect abnormal conditions, critical failures (e.g., voltage, current, temperature, cell health), battery detach during operation, and/or voltage and current during operation.

The electro-mechanical interface 1420 may be used to removably attach the flight battery 1400 to an aerial vehicle (e.g., the aerial vehicle 1300). The flight battery 1400 may supply power to the aerial vehicle via conductors in the electro-mechanical interface 1420 during flight or other operations. The electro-mechanical interface 1420 may be improved relative to older systems to have a dual-independent positive latches for improved fail-safety. The electro-mechanical interface 1420 may be configured such that the flight battery is top loading, which allows the flight battery to naturally stay seated during normal operation. A communication link 1422 (e.g., a USB or other serial port link) may be established between the aerial vehicle and the fuel gauge 1410 via conductors of the electro-mechanical interface 1420 to enable the transfer of status and control signals.

The LEDs 1430 may be positioned on the exterior of the flight battery 1400 and configured to provide status information about the flight battery (e.g., charging state).

The button 1440 may be a multi-function button, which may be used to operate both the flight battery 1400 and an aerial vehicle (e.g., a drone).

The cells 1450 may include an increased cell chemistry, relative to some older flight batteries) for higher gravimetric density to improve flight time. In some implementations, an image capture system may include a specialized charger for the flight battery 1400 that may be attached to flight battery 1400 for charging when the flight battery is not in use with an aerial vehicle. For example, the specialized charger may attach to flight battery 1400 via the electro-mechanical interface 1420. The specialized charger may provide an ability to detect multiple different batteries and charge them in a manner tailored to the respective batteries. The specialized charger may enable faster charging times and have reduced mass and volume relative to some older systems.

Figure 15:
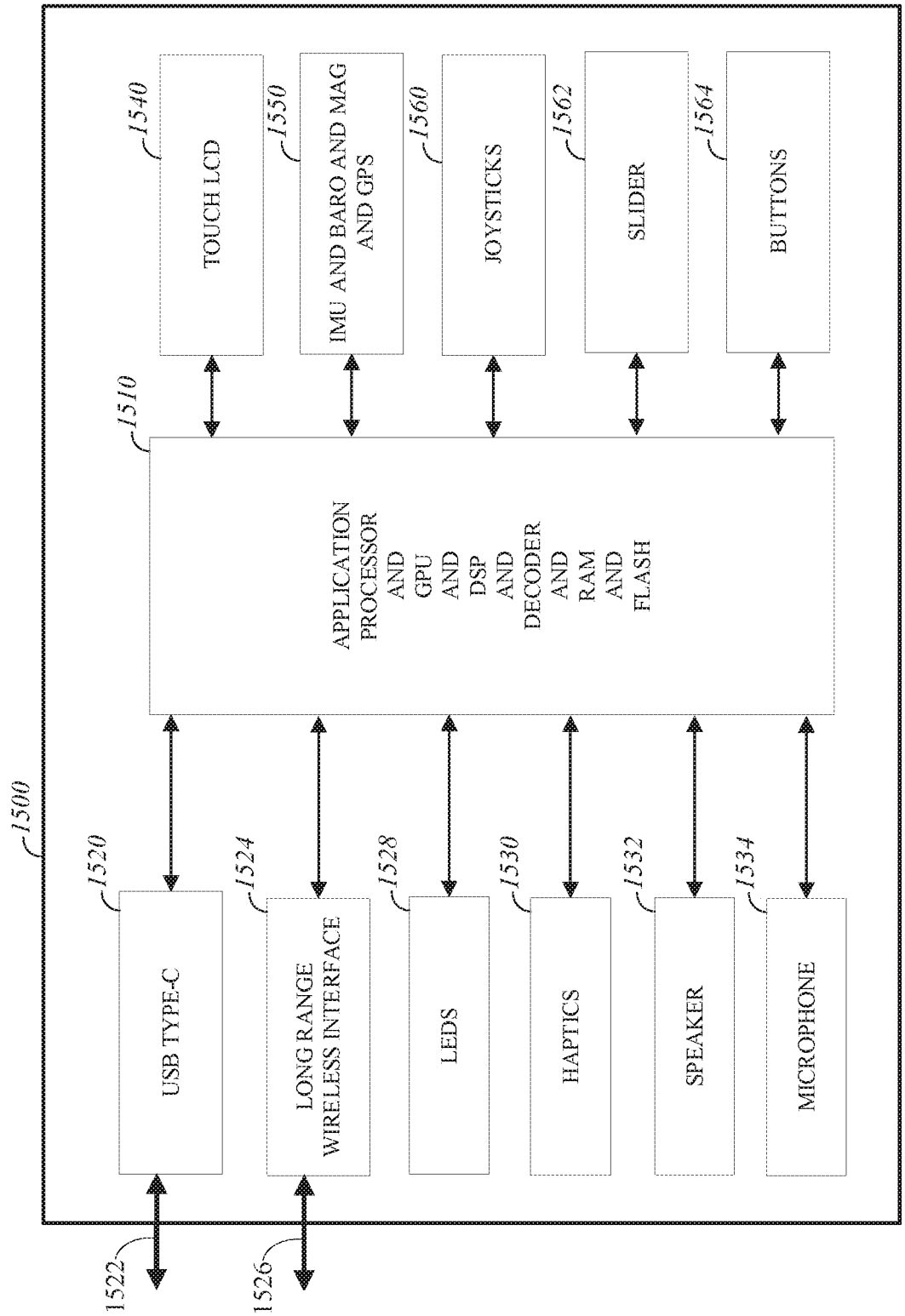
FIG. 15 is a block diagram of an example of a controller module.

FIG. 15 is a block diagram of an example of a controller module 1500. The controller module 1500 includes a processing apparatus 1510, a USB type-C interface 1520, a long range wireless interface 1524, LEDs 1528, haptics 1530, a speaker 1532, a microphone 1534, a touch LCD 1540, motion sensors 1550, joysticks 1560, a slider 1562, and buttons 1564. For example, the controller module 1500 may be the controller module 140 of FIGS. 1A and 1B.

For example, the processing apparatus 1510 may include an application processor, a graphics processing unit (GPU), a digital signal processor (DSP), a decoder (e.g., a video decoder), random access memory (RAM), and/or a flash memory. In some implementations, an application processor with improved microprocessor, DSP, decoder, and GPU are included in the processing apparatus 1510 to improve software and simulator smoothness and implement new updatable software features.

The USB type-C interface 1520 may enable connection of the controller module 1500 to an external computing device (e.g., a laptop or tablet) for fast data transfers via a communication link 1522 (e.g., using USB 3.0 signals) and charging of a battery of the controller module 1500.

Information (e.g., control signals and/or image data) may be transferred between a movable imaging assembly (e.g., including the aerial vehicle 1300 or the handheld module 1100) and the controller module 1500 via a wireless link 1526. For example, the wireless link 1526 may utilize a wireless interface standard, such as WiFi, Bluetooth (BT), cellular data link, ZigBee, ANT+ link, and/other wireless protocols. For example, images (e.g., still images or video at full resolution or at reduced resolution) captured by an image sensor of the movable imaging assembly may be received by the controller module 1500 and displayed on the touch LCD 1540 to the user. The long range wireless interface 1524 may be improved relative to older systems to enable longer range and higher resilience to noise.

The LEDs 1528 may be positioned on the controller module 1500 and configured to indicate to a user status of the controller module 1500 and a movable imaging assembly that is being controlled via the wireless link 1526.

The haptics 1530 may be configured to vibrate or otherwise provide haptic feedback to a user of the controller module 1500 that is controlling a moving imaging assembly. For example, the haptics 1530 may be configured to vibrate when an aerial vehicle (e.g., the aerial vehicle 1300) controlled by the controller module 1500 approaches or enters a designated no-fly zone.

For example, the touch LCD 1540 may be similar to the display 610 of FIG. 6A. In some implementations, the touch LCD 1540 has increased screen brightness compared to some older systems to better facilitate outdoor use.

For example, the motion sensors 1550 may include an inertial measurement unit (IMU), a barometer, a magnetometer, and/or a GPS receiver. In some implementations, an IMU, barometer, and magnetometer are improved (e.g., provide higher accuracy measurements) relative to some older systems in order to better enable follow and localization software.

The joysticks 1560 (e.g., the left joystick 620 and the right joystick 622 of FIG. 6A) may be configured for controlling motion of a movable imaging assembly (e.g., a movable imaging assembly including the image capture module 1200 and the handheld module 1100 or the aerial vehicle 1300) and/or panning of an image sensor (e.g., the image sensor 1220) using a mechanical stabilization system of the movable imaging assembly. In some implementations, the joysticks 1560 may have improved accuracy and dead-zone compared to some older systems.

For example, the slider 1562 may be configured to control panning of an image sensor (e.g., the image sensor 1220). In some implementations, the slider 1562 may have increased slider range and/or improved accuracy and dead-zone compared to some older systems.

Figure 16:
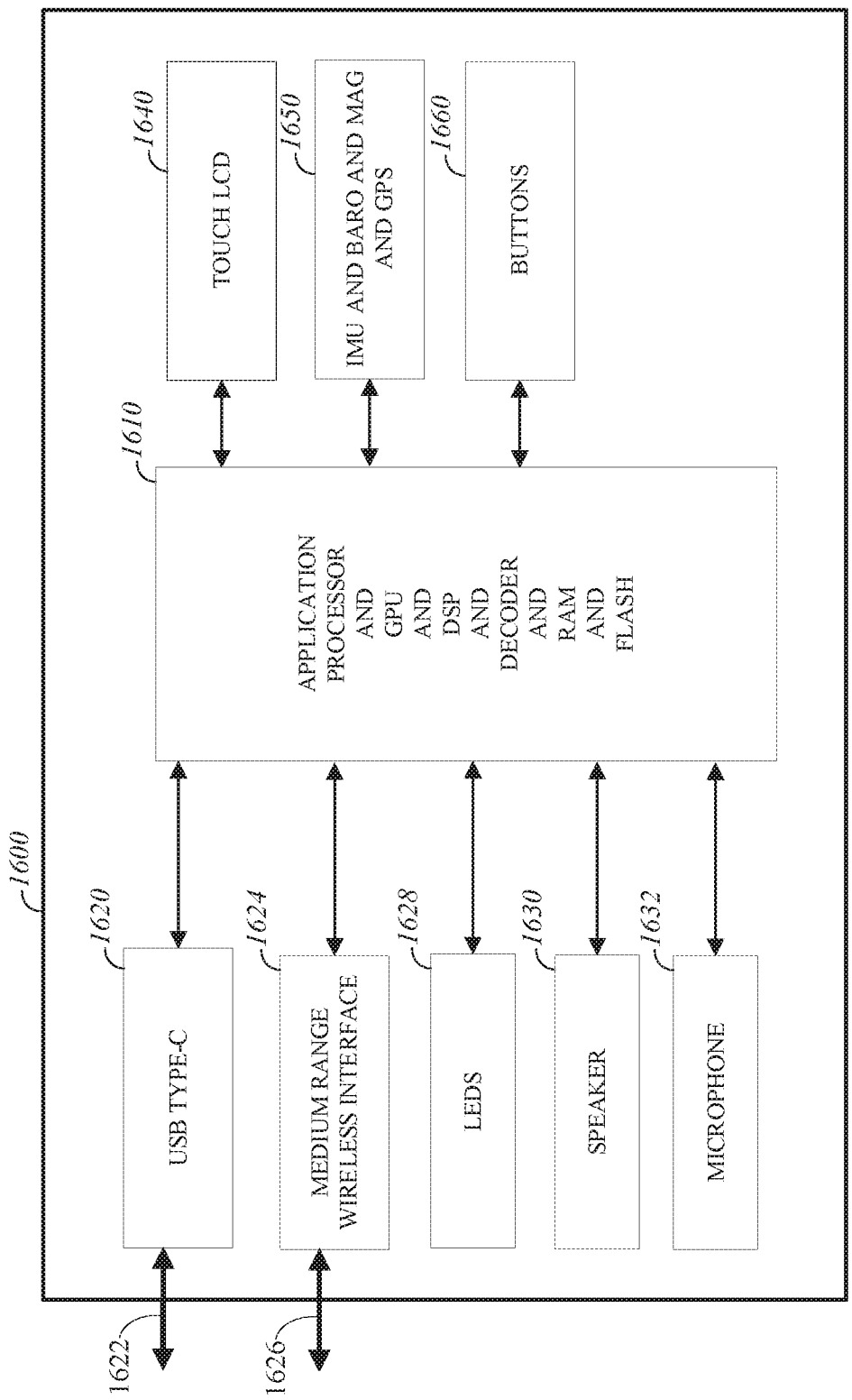
FIG. 16 is a block diagram of an example of a beacon module.

FIG. 16 is a block diagram of an example of a beacon module 1600. The beacon module 1600 includes a processing apparatus 1610, a USB type-C interface 1620, a medium range wireless interface 1624, LEDs 1628, a speaker 1630, a microphone 1632, a touch LCD 1640, motion sensors 1650, and buttons 1660. For example, the beacon module 1600 may be the beacon module 150 of FIGS. 1A and 1B.

For example, the processing apparatus 1610 may include an application processor, a graphics processing unit (GPU), a digital signal processor (DSP), a decoder (e.g., a video decoder), random access memory (RAM), and/or a flash memory. In some implementations, an application processor with improved microprocessor, DSP, decoder, and GPU are included in the processing apparatus 1610 to improve software and implement new updatable software features. For example, the processing apparatus may be configured with software to generate and transmit position data to a movable imaging assembly to enable hands-free operation and follow-me functionality.

The USB type-C interface 1620 may enable connection of the beacon module 1600 to an external computing device (e.g., a laptop or tablet) for fast data transfers via a communication link 1622 (e.g., using USB 3.0 signals) and charging of a battery of the beacon module 1600.

Information (e.g., position data and/or other control signals) may be transferred between a movable imaging assembly (e.g., including the aerial vehicle 1300 or the handheld module 1100) and the beacon module 1600 via a wireless link 1626. For example, the wireless link 1626 may utilize a wireless interface standard, such as WiFi, Bluetooth (BT), cellular data link, ZigBee, ANT+ link, and/other wireless protocols. The medium range wireless interface 1624 may be improved relative to older systems to enable longer range and higher resilience to noise.

The LEDs 1628 may be positioned on the beacon module 1600 and configured to indicate to a user status of the beacon module 1600 and a movable imaging assembly that is being controlled via the wireless link 1626.

For example, the touch LCD 1640 may be small so as to fit on a compact beacon module 1600. In some implementations, the touch LCD 1640 has increased screen brightness compared to some older systems to better facilitate outdoor use.

For example, the motion sensors 1650 may include an inertial measurement unit (IMU), a barometer, a magnetometer, and/or a GPS receiver. In some implementations, an IMU, barometer, and magnetometer are improved (e.g., provide higher accuracy measurements) relative to some older systems in order to better enable follow and localization software.

For example, the buttons 1660 may be similar to the buttons illustrated on the beacon module 650 of FIG. 6B.

A user may switch between various usage scenarios of the movable imaging system 100, including the first usage scenario of FIG. 1A and the second usage scenario of FIG. 1B, to tailor their mode of image capture to varying circumstances. For example, a user may implement the process 1700 of FIG. 17 using the movable imaging system 100.

Figure 17:
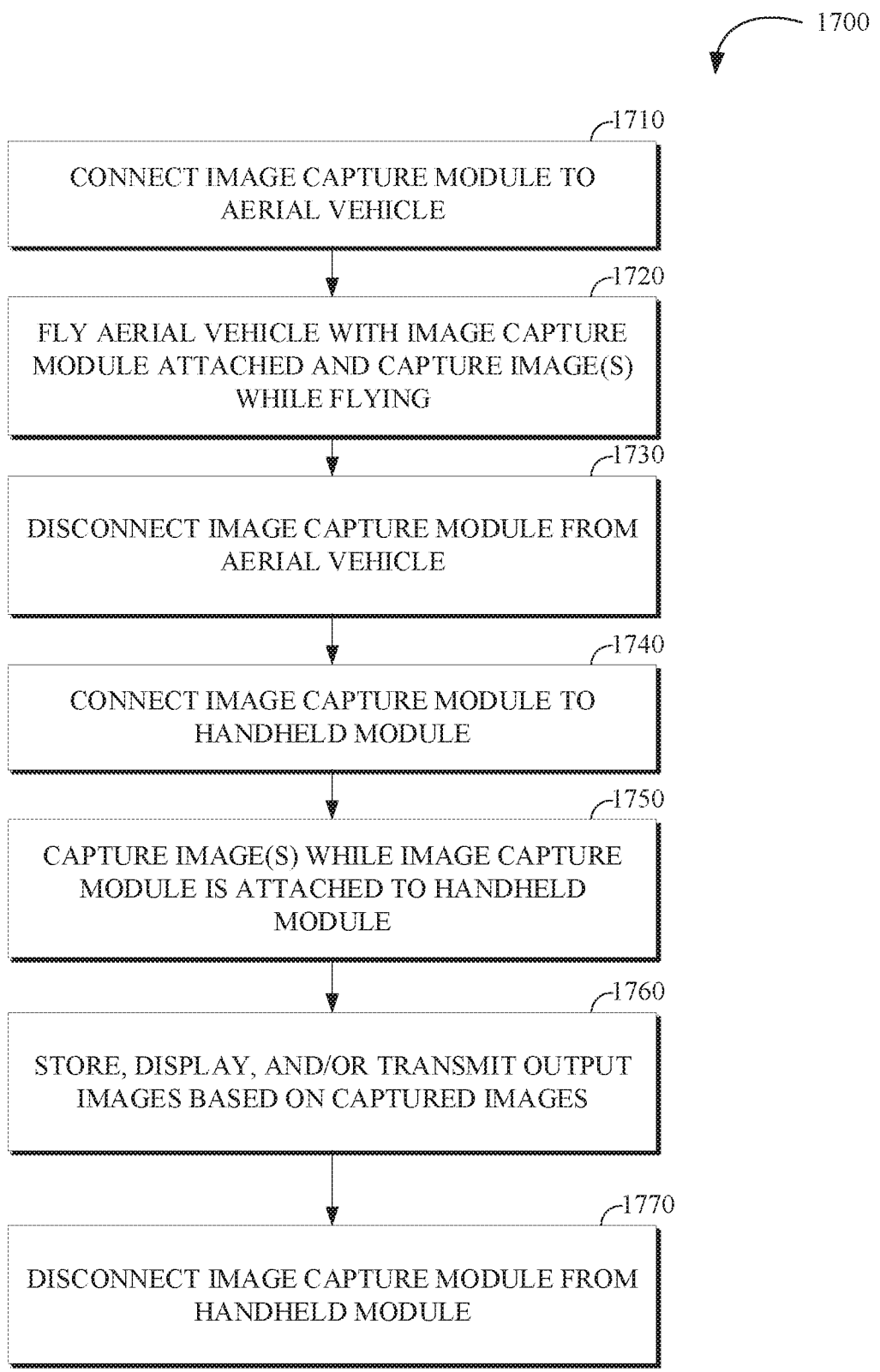
FIG. 17 is a flowchart of an example of a process for utilizing a movable imaging system with modular components in multiple usage scenarios.

FIG. 17 is a flowchart of an example of a process 1700 for utilizing a movable imaging system with modular components in multiple usage scenarios. The process 1700 includes connecting 1710 an image capture module, which includes an image sensor and an integrated mechanical stabilization system, to an aerial vehicle; flying 1720 the aerial vehicle with the image capture module attached to the aerial vehicle and capturing a first image with the image sensor while flying; disconnecting 1730 the image capture module from the aerial vehicle; connecting 1740 the image capture module to a handheld module, which includes a battery; capturing 1750 a second image with the image sensor while the image capture module is attached to the handheld module and drawing power from the battery; storing, displaying, or transmitting 1760 output images based on the first image and the second image; and disconnecting 1770 the image capture module from the handheld module. For example, the process 1700 may be implemented using the movable imaging system 100.

The process 1700 includes connecting 1710 an image capture module (e.g., the image capture module 110), which includes an image sensor and an integrated mechanical stabilization system, to an aerial vehicle (e.g., the aerial vehicle 120). For example, the image capture module may include a connector (e.g., the connector 230) that is keyed to a slot (e.g., the slot 530) of the aerial vehicle. For example, connecting 1710 the image capture module to the aerial vehicle may include inserting the connector in the slot. When the connector is inserted into the slot, paired fastening mechanisms (e.g., latches) in the connector and the slot may engage to secure the newly formed connection. For example, spring loaded latches may engage to secure the connection. As part of the connection, mated electronic connectors (e.g., USB Type C connectors) nested in the connector and the slot may engage to form an electronic connection including multiple conductors, which may be used to supply power from the aerial vehicle to the image capture module and to transfer control signals and data (e.g., image data) between the attached image capture module and aerial vehicle. For example, the mechanical stabilization system includes gimbals and motors controlled by proportional integral derivative controllers.

The process 1700 includes flying 1720 the aerial vehicle (e.g., the aerial vehicle 120) with the image capture module (e.g., the image capture module 110) attached to the aerial vehicle and capturing a first image with the image sensor while flying. For example, flying 1720 the aerial vehicle and capturing the first image may include issuing commands (e.g., a take-off command, a "follow-me" command to track subject, a start-capture command, and/or six-degrees of freedom navigation and panning commands) to the aerial vehicle and/or the image capture module via a wireless communications link from a controller module (e.g., the controller module 140), a beacon module (e.g., the beacon module 150), and/or a personal computing device (e.g., a smartphone, a tablet, or a laptop). For example, the aerial vehicle may be instructed to follow a user bearing a beacon module that transmits position data to the aerial vehicle. For example, the process 1800 of FIG. 18 may be implemented to control the aerial vehicle and attached image capture module with the controller module and the beacon module to cause it to capture the first image.

The process 1700 includes disconnecting 1730 the image capture module (e.g., the image capture module 110) from the aerial vehicle (e.g., the aerial vehicle 120). For example, disconnecting 1730 the image capture module from the aerial vehicle may include releasing fastening mechanisms of the connector (e.g., the connector 230) and the slot (e.g., the slot 530). For example, latches may be manually released by a user using their fingers on buttons or release levers. In some implementations, two latches must be simultaneously released in order to disconnect 1730 the aerial vehicle from the image capture module.

The process 1700 includes connecting 1740 the image capture module (e.g., the image capture module 110) to a handheld module (e.g., the handheld module 130), which includes a battery and an integrated display. For example, the image capture module may include a connector (e.g., the connector 230) that is keyed to a slot (e.g., the slot 340) of the handheld module. For example, connecting 1740 the image capture module to the handheld module may include inserting the connector in the slot. When the connector is inserted into the slot, paired fastening mechanisms (e.g., latches) in the connector and the slot may engage to secure the newly formed connection. For example, spring loaded latches may engage to secure the connection. As part of the connection, mated electronic connectors (e.g., USB Type C connectors) nested in the connector and the slot may engage to form an electronic connection including multiple conductors, which may be used to supply power from the battery to the image capture module and to transfer control signals and data (e.g., image data) between the attached image capture module and handheld module.

The process 1700 includes capturing 1750 a second image with the image sensor while the image capture module (e.g., the image capture module 110) is attached to the handheld module (e.g., the handheld module 130) and drawing power from the battery. For example, capturing 1750 the second image may include issuing commands (e.g., a "follow-me" command to track subject, a "selfie-mode" command, a "HiLight Tag" command, a start-capture command, and/or three-degrees of freedom panning commands) to the handheld module and/or the image capture module via a wireless communications link from a controller module (e.g., the controller module 140), a beacon module (e.g., the beacon module 150), and/or a personal computing device (e.g., a smartphone, a tablet, or a laptop). For example, the handheld module may be instructed to follow a user bearing a beacon module that transmits position data to the handheld module.

The process 1700 includes storing, displaying, or transmitting 1760 output images based on the first image and the second image. For example, the process 1900 of FIG. 19 may be implemented to transmit and display 1760 an output image based on the second image. In some implementations, one of the output image is the first image. In some implementations, one of the output images is the second image. In some implementations, the first image and the second image may by subject to additional image processing (e.g., perceptual tone mapping, lens distortion correction, electronic rolling shutter correction, stitching with parallax correction and blending to combine images from multiple image sensors, and/or output projection) to determine respective output images. For example, the output images may be transmitted 1760 to an external device (e.g., a personal computing device) for display or storage. For example, the output images may be stored 1760 in memory of a processing apparatus (e.g., the processing apparatus 712 or the processing apparatus 762). For example, the output images may be displayed 1760 in the user interface 720 or in the user interface 764. For example, the output images may be transmitted 1760 via the communications interface 722.

The process 1700 includes disconnecting 1770 the image capture module (e.g., the image capture module 110) from the handheld module (e.g., the handheld module 130). For example, disconnecting 1770 the image capture module from the handheld module may include releasing fastening mechanisms of the connector (e.g., the connector 230) and the slot (e.g., the slot 340). For example, latches may be manually released by a user using their fingers on buttons or release levers. In some implementations, two latches must be simultaneously released in order to disconnect 1730 the handheld module from the image capture module.

Figure 18:
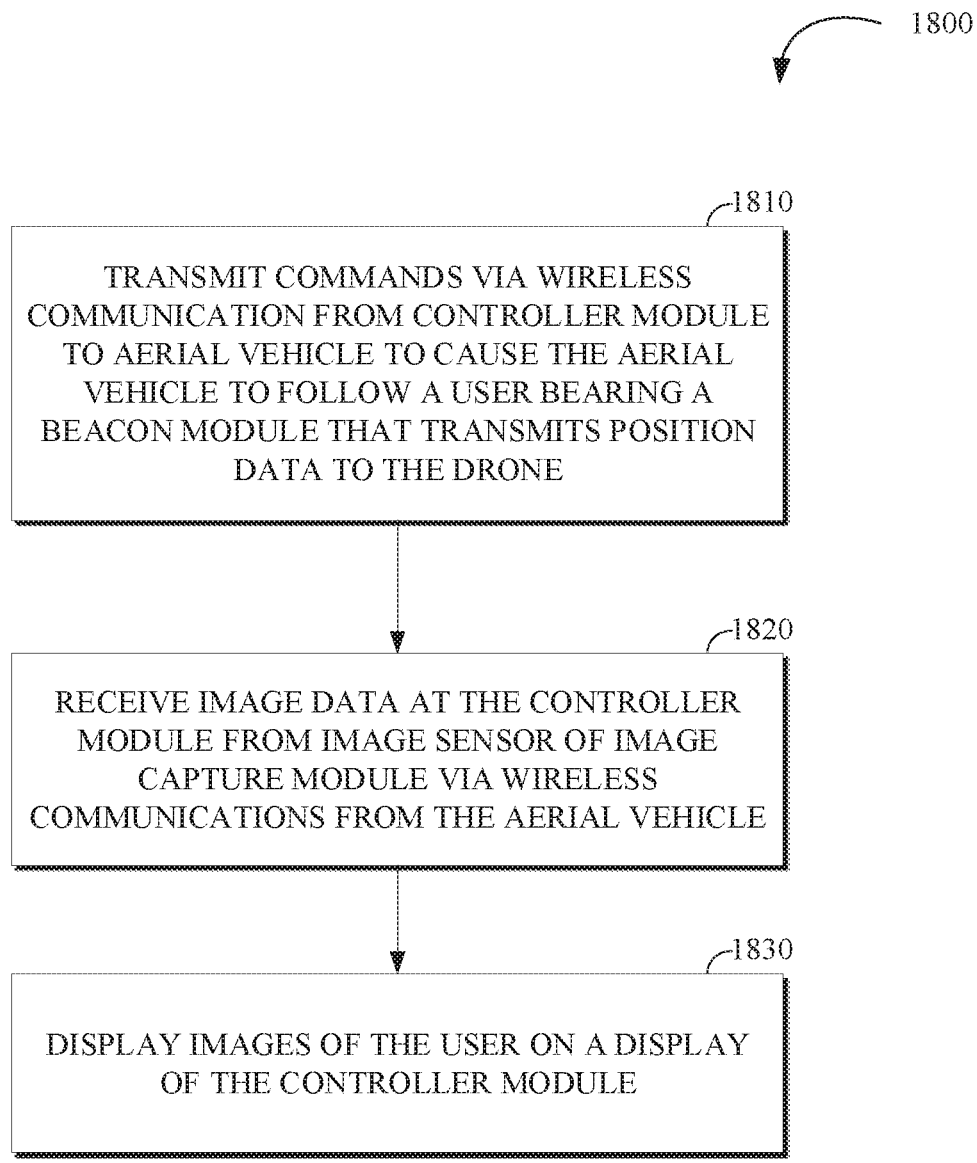
FIG. 18 is a flowchart of an example of a process for controlling a movable imaging assembly for image capture using a controller module and a beacon module.

FIG. 18 is a flowchart of an example of a process 1800 for controlling a movable imaging assembly for image capture using a controller module and a beacon module. The process 1800 includes transmitting 1810 commands via wireless communications from a controller module to the aerial vehicle to cause an aerial vehicle to follow a user bearing a beacon module that transmits position data to the aerial vehicle; receiving 1820 image data at the controller module from the image sensor via wireless communications from the aerial vehicle; and displaying 1830 images of the user on a display of the controller module. For example, the process 1700 may be implemented using the movable imaging system 100.

The process 1800 includes transmitting 1810 commands via wireless communications from a controller module (e.g., the controller module 140) to an aerial vehicle (e.g., the aerial vehicle 120) to cause the aerial vehicle to follow a user bearing a beacon module (e.g., the beacon module 150) that transmits position data to the aerial vehicle. For example, the beacon module may include a GPS receiver and the position data may include GPS coordinates of the beacon module. In some implementations, beacon module includes an inertial measurement unit (e.g., including accelerometers, gyroscopes, and/or magnetometers) and the position data includes changes in the position and/or orientation of the beacon module that are sensed by the inertial measurement unit. For example, the wireless communications may utilize a wireless interface standard, such as WiFi, Bluetooth (BT), cellular data link, ZigBee, or ANT+.

The process 1800 includes receiving 1820 image data at the controller module (e.g., the controller module 140) from the image sensor via wireless communications from the aerial vehicle (e.g., the aerial vehicle 120). The process 1800 includes displaying 1830 images of the user on a display (e.g., the display 610) of the controller module (e.g., the controller module 140).

Figure 19:
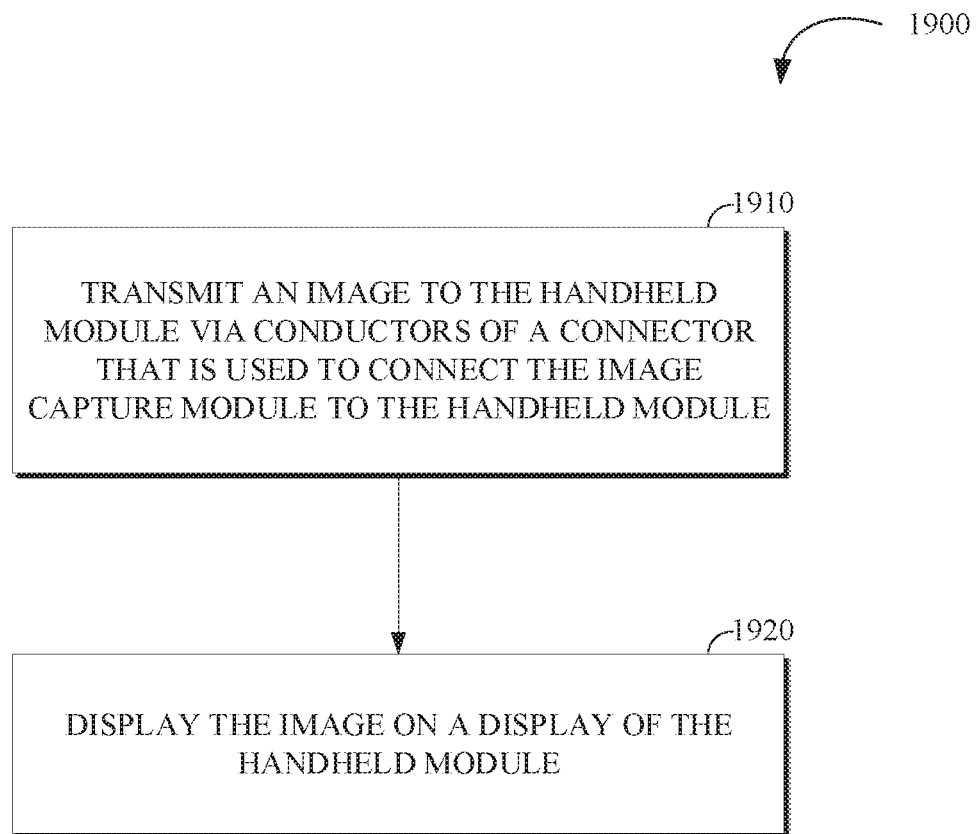
FIG. 19 is a flowchart of an example of a process for displaying images captured with an image capture module on a connected handheld module.

FIG. 19 is a flowchart of an example of a process 1900 for displaying images captured with an image capture module (e.g., the image capture module 110) on a connected handheld module (e.g., the handheld module 130). The process 1900 includes transmitting 1910 an image to the handheld module via conductors of a connector (e.g., the connector 230) that is used to connect the image capture module to a handheld module and displaying 1920 the second image on a display (e.g., the display 310) of the handheld module. For example, the image may be transmitted 1910 via high-speed bulk transfer (e.g., using a USB 2.0 or USB 3.0 signaling) over the conductors. For example, the image may be transmitted 1910 as raw image (e.g., video) data at the captured frame rate using MIPI signaling. In some implementations, the image is transmitted 1910 via multiple pairs of conductors of the connector, which may include a USB Type C connector.

When the movable imaging assembly 162, including the handheld module 130, is mounted to a chest or shoulder, a user may want to rotate the handle clockwise or counter-clockwise for off-center capture during activities such as snowboarding. A floating pivot quick release mount for the handheld module 130 may allow a user to rotate the movable imaging assembly 162 to 180° quickly and easily during use to enable off-center capture. A movable imaging assembly 162 is inserted downward into gap in a soft inner frame of the mount with a cross-section approximately matching a horizontal cross-section of the handheld module 130. Once snug within the inner frame, a cantilevered latch on a hard outer frame is rotated to a closed/locked position. One or more cables are attached to the latch and wrapped around the outer frame and a floating finger mount. By locking the latch closed, the one or more cables are tightened to secure the floating finger mount in place with sufficient force to keep the floating finger mount locked in position during active use. The outer frame and floating finger mount may have a textured, grooved, or angled contact surface to assist with maintaining a fixed position when locked in place.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
    an image capture module including:
        an image sensor configured to capture images,
        a base including a processing apparatus, a connector, a bottom, and a top; and
        an integrated mechanical stabilization system connected to and extending from the base and configured to control an orientation of the image sensor relative to the base,
        wherein the processing apparatus is configured to send commands to motor controllers of the integrated mechanical stabilization system;
        wherein the processing apparatus includes an image signal processor that is configured to receive image data from the image sensor; and
        wherein the integrated mechanical stabilization system includes at least one gimbal that extends into the base and is substantially flush with the top of the base;
    an aerial vehicle configured to be removably attached to the image capture module by the base extending substantially entirely into a first slot on a front face of a body of the aerial vehicle so that the bottom extends into the first slot and the top is substantially flush with the front face,
        wherein the aerial vehicle flies while carrying the image capture module, and
        wherein the base is shaped to match a shape of the first slot so that the base is housed within the first slot; and
    a handheld module configured to be removably attached to the image capture module by the base extending substantially entirely into a second slot on a top face of the handheld module so that the bottom extends into the second slot and the top is substantially flush with the top face,
        wherein the handheld module includes a display configured to display images received from the image sensor via conductors of the connector,
        wherein the base is shaped to match a shape of the second slot so that the base is housed within the first slot, and
        wherein the shape of the first slot and the shape of the second slot are identical.

2. The system of claim 1, wherein the at least one gimbal of the mechanical stabilization system is three gimbals, wherein the three gimbals include an outer axis that is attached to the image sensor, a motion sensor, and a microphone, and wherein the processing apparatus is configured to receive data from the motion sensor and data from the microphone via conductors routed through the mechanical stabilization system.

3. The system of claim 1, comprising:
    a beacon module configured to wirelessly transmit position data to the aerial vehicle to enable the aerial vehicle to follow the beacon module.

4. The system of claim 3, wherein the aerial vehicle is configured to follow a user based on position data from the beacon module and based on computer vision tracking of the user in images from the image capture module.

5. The system of claim 1, wherein the connector is keyed to the first slot of the aerial vehicle and keyed to the second slot of the handheld module.

6. The system of claim 1, wherein the handheld module includes two fastening mechanisms configured to secure the connector when the image capture module is attached to the handheld module, and wherein either of the two fastening mechanisms is sufficient to secure the connector.

7. The system of claim 1, wherein the at least one gimbal of the mechanical stabilization system connected to the base is substantially flush with a surface of the handheld module when the image capture module is attached to the handheld module.

8. The system of claim 1, wherein the connector includes pairs of conductors respectively used to transfer power to the image capture module, bulk transfer data from the image capture module, transfer control signals to the image capture module, and transfer real-time video data from the image capture module.

9. The system of claim 1, wherein an opening of the first slot is in the front face so that the connector axially extends into the first slot, and wherein the second slot is in an upper wall of the handheld module so that the connector is axially extendable into the second slot and the image sensor is located axially outside of the second slot.

10. The system of claim 1, further comprising:
    one or more motion sensors that are configured to detect motion of the image sensor and are in communication with the integrated mechanical stabilization system.

11. An image capture module comprising:
    an image sensor configured to capture images;
    a mechanical stabilization system, including gimbals and motors, that is integrated with the image sensor in the image capture module and configured to control an orientation of the image sensor; and
    a base including a top, a bottom, a processing apparatus, and a connector,
    wherein one of the gimbals is connected to and is substantially flush with the top of the base,
    wherein the base is configured to interchangeably connect the mechanical stabilization system to an aerial vehicle and a handheld module,
    wherein the base is shaped to match a shape of a slot that is within both the aerial vehicle and the handheld module and the base is insertable into the slot located on a front face of a body of the aerial vehicle so that the top of the base is substantially flush with the front face and the slot located on a top face of the handheld module so that the top of the base is substantially flush with the top face, and
    wherein the processing apparatus is configured to send commands to motor controllers of the mechanical stabilization system and includes an image signal processor that is configured to receive image data from the image sensor.

12. The image capture module of claim 11, in which the mechanical stabilization system includes an outer axis that is attached to the image sensor, a motion sensor, and a microphone; and the processing apparatus is configured to receive data from the motion sensor and data from the microphone via conductors routed through the mechanical stabilization system.

13. The image capture module of claim 11, comprising a processing apparatus configured to:
   track a user based on position data from a beacon module and based on computer vision tracking of the user in images from the image sensor.

14. The image capture module of claim 11, wherein the connector is keyed to the slot of the aerial vehicle and keyed to the slot of the handheld module.

15. The image capture module of claim 11, wherein the connector includes two fastening mechanisms configured to secure the connector when the image capture module is attached to the handheld module, and wherein either of the two fastening mechanisms is sufficient to secure the connector.

16. The image capture module of claim 11, wherein the one of the gimbles that is connected to the base is substantially flush with a surface of the handheld module when the image capture module is attached to the handheld module.

17. The image capture module of claim 11, wherein the connector includes pairs of conductors respectively used to transfer power to the image capture module, bulk transfer data from the image capture module, transfer control signals to the image capture module, and transfer real-time video data from the image capture module.

18. The image capture module of claim 11, wherein the connector is axially insertable into the slot within the aerial vehicle and the handheld module to connect the connector to the aerial vehicle and the handheld vehicle.

\* \* \* \* \*